(12) United States Patent
Muramoto

(10) Patent No.: US 10,455,151 B2
(45) Date of Patent: Oct. 22, 2019

(54) SIGNAL PROCESSING CIRCUIT AND IMAGING APPARATUS

(71) Applicant: SONY SEMICONDUCTOR SOLUTIONS CORPORATION, Kanagawa (JP)

(72) Inventor: Junichi Muramoto, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 147 days.

(21) Appl. No.: 15/511,031

(22) PCT Filed: Sep. 14, 2015

(86) PCT No.: PCT/JP2015/075947
§ 371 (c)(1),
(2) Date: Mar. 14, 2017

(87) PCT Pub. No.: WO2016/047473
PCT Pub. Date: Mar. 31, 2016

(65) Prior Publication Data
US 2017/0289449 A1  Oct. 5, 2017

(30) Foreign Application Priority Data
Sep. 24, 2014 (JP) .................. 2014-193259

(51) Int. Cl.
*H04N 5/232* (2006.01)
*G06T 3/40* (2006.01)
(Continued)

(52) U.S. Cl.
CPC ....... *H04N 5/23238* (2013.01); *G06T 3/4038* (2013.01); *H04N 5/2258* (2013.01);
(Continued)

(58) Field of Classification Search
CPC . H04N 5/23238; H04N 5/2258; H04N 1/3876
See application file for complete search history.

(56) References Cited

U.S. PATENT DOCUMENTS 6,307,550 B1 * 10/2001 Chen ............... G06T 3/4053
345/418
6,701,030 B1 * 3/2004 Uyttendaele ........ G06K 9/03
348/36
(Continued)

FOREIGN PATENT DOCUMENTS

JP 2000-358194 A 12/2000
JP 2005-141527 A 6/2005
JP 2009-85651 A 4/2009

OTHER PUBLICATIONS

International Search Report and Written Opinion of PCT Application No. PCT/JP2015/075947, dated Nov. 24, 2015, 05 pages of English Translation and 05 pages of ISRWO.
(Continued)

*Primary Examiner* — Pankaj Kumar
*Assistant Examiner* — Timothy R Newlin
(74) *Attorney, Agent, or Firm* — Chip Law Group

(57) ABSTRACT

The present disclosure relates to a signal processing circuit and an imaging apparatus by which a plurality of images including an overlapping region can be accurately stitched. Stitching (projective transformation and warping) is performed on direct-transformation region images on the basis of camera initial condition information (information on directions of camera modules) stored in an EEPROM. Stitching is performed on overlapping-region images under the determined composition condition. Stitching is performed on buffer region images by the use of a value (e.g., moderate value) determined on the basis of a projective transformation condition of the direct-transformation region images and a projective transformation condition of the overlapping-region images. The present disclosure is applicable to, for example, a signal processing circuit used in an imaging apparatus such as a camera.

8 Claims, 25 Drawing Sheets

(51) Int. Cl.
 H04N 5/247 (2006.01)
 H04N 5/225 (2006.01)
 H04N 5/262 (2006.01)
(52) U.S. Cl.
 CPC ........... *H04N 5/247* (2013.01); *H04N 5/2628* (2013.01); *G06T 2200/32* (2013.01)

(56) References Cited

U.S. PATENT DOCUMENTS

| | | | | |
|---|---|---|---|---|
| 6,788,333 | B1* | 9/2004 | Uyttendaele | H04N 5/23238 348/36 |
| 6,813,391 | B1* | 11/2004 | Uyttendaele | G06K 9/03 345/629 |
| 7,006,111 | B1* | 2/2006 | Rothrock | G06T 3/4038 345/419 |
| 8,169,620 | B1* | 5/2012 | Stahl | G01B 11/2441 356/513 |
| 9,589,350 | B1* | 3/2017 | Kozko | H04N 5/23238 |
| 2002/0163530 | A1* | 11/2002 | Takakura | G06T 3/4038 345/629 |
| 2003/0184778 | A1* | 10/2003 | Chiba | H04N 1/3876 358/1.9 |
| 2004/0169870 | A1* | 9/2004 | Ahmed | G06T 3/403 358/1.8 |
| 2005/0008240 | A1* | 1/2005 | Banerji | H04N 5/2624 382/238 |
| 2005/0169555 | A1 | 8/2005 | Hasegawa | |
| 2006/0072176 | A1* | 4/2006 | Silverstein | G06T 3/005 358/540 |
| 2007/0031062 | A1* | 2/2007 | Pal | G06K 9/32 382/284 |
| 2007/0081091 | A1* | 4/2007 | Pan | A61B 1/00165 348/335 |
| 2008/0180550 | A1* | 7/2008 | Gulliksson | H04N 5/232 348/231.99 |
| 2009/0022421 | A1* | 1/2009 | Uyttendaele | G06T 3/4038 382/284 |
| 2009/0051778 | A1* | 2/2009 | Pan | H04N 5/232 348/218.1 |
| 2010/0097443 | A1* | 4/2010 | Lablans | G03B 37/00 348/36 |
| 2010/0235095 | A1* | 9/2010 | Smitherman | G01C 11/02 701/532 |
| 2010/0265313 | A1* | 10/2010 | Liu | G06T 3/4038 348/36 |
| 2011/0142370 | A1* | 6/2011 | Joshi | G06T 3/4038 382/307 |
| 2012/0293610 | A1* | 11/2012 | Doepke | H04N 5/23238 348/36 |
| 2014/0028851 | A1* | 1/2014 | Shan | H04N 5/2258 348/159 |
| 2015/0131924 | A1* | 5/2015 | He | G06T 3/0018 382/284 |
| 2015/0348580 | A1* | 12/2015 | van Hoff | G11B 19/20 348/38 |
| 2016/0295126 | A1* | 10/2016 | Wang | A61B 1/041 |
| 2017/0070674 | A1* | 3/2017 | Thurow | H04N 7/181 |

OTHER PUBLICATIONS

International Preliminary Report on Patentability of PCT Application No. PCT/JP2015/075947, dated Apr. 6, 2017, 07 pages Of English Translation and 03 pages of IPRP.

* cited by examiner

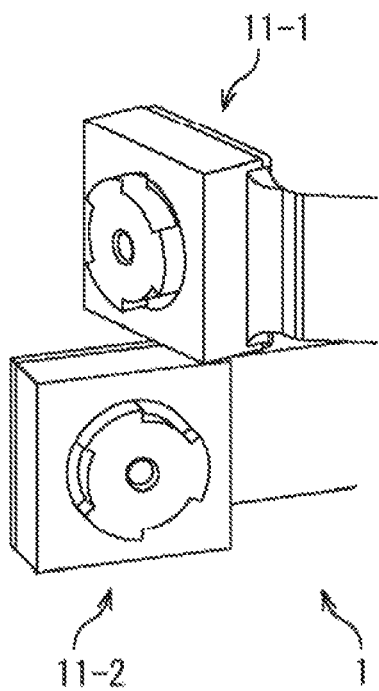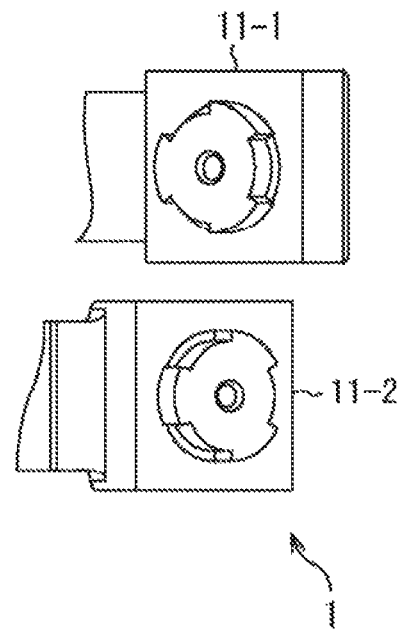
FIG. 1A  FIG. 1B
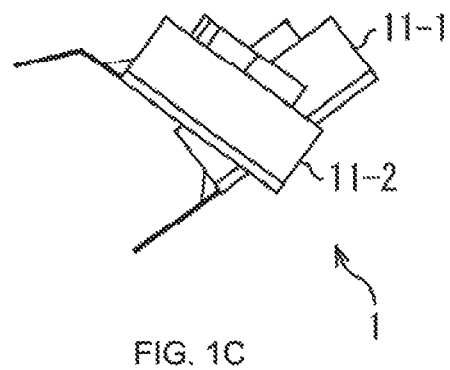
FIG. 1C

SIGNAL PROCESSING CIRCUIT AND IMAGING APPARATUS

CROSS REFERENCE TO RELATED APPLICATIONS

This application is a U.S. National Phase of International Patent Application No. PCT/JP2015/075947 filed on Sep. 14, 2015, which claims priority benefit of Japanese Patent Application No. JP 2014-193259 filed in the Japan Patent Office on Sep. 24, 2014. Each of the above-referenced applications is hereby incorporated herein by reference in its entirety.

TECHNICAL FIELD

The present disclosure relates to a signal processing circuit and an imaging apparatus, and more particularly to a signal processing circuit and an imaging apparatus by which a plurality of images including an overlapping region can be accurately stitched.

BACKGROUND ART

There is a method in which, using two or more camera modules, stitching processing is performed on photographic images, to thereby enlarge a photographic angle-of-view. In such a method, the cameras are placed with their directions fixed such that photographic ranges of the cameras partially overlap each other. Thus, a photographic range includes a region overlapping a neighbor photographic range.

For example, Patent Document 1 has described the following technology. In this technology, a pair of corresponding feature points are extracted from an overlapping region of two screens. A composition condition (registration condition) such as directions and magnifications of images is calculated such that coordinates of the feature points of both are closer to each other. Both the images are deformed on the basis of a result thereof and stitched into a single image.

CITATION LIST

Patent Literature

Patent Literature 1: Japanese Patent No. 3302236

DISCLOSURE OF INVENTION

Technical Problem

However, when the overlapping region is made smaller for widening the photographic angle-of-view after stitching, errors between the feature points remarkably appear on an opposite side of the overlapping region in some cases. In particular, with moving images, when such errors are converted per frame, an angle-of-view of an entire image slightly and quickly changes, which causes disagreeable sensations in viewing.

The present disclosure has been made in view of the above-mentioned circumstances, which is capable of accurately stitching a plurality of images including an overlapping region.

Solution to Problem

A signal processing circuit according to a first aspect of the present technology includes: an image segmentation unit that segments each of a plurality of photographic images, which are acquired by a plurality of camera modules such that each of the plurality of photographic images includes an overlapping region in a photographic range of each of the plurality of camera modules, into an image of the overlapping region, an image of a direct-transformation region that is a non-overlapping region, and an image of a buffer region provided between the overlapping region and the direct-transformation region; and a stitching unit that stitches the images of the overlapping regions, stitches the images of the direct-transformation regions, and stitches the images of the buffer regions, the images of the overlapping regions, the images of the direct-transformation regions, and the images of the buffer regions being segmented by the image segmentation unit.

The stitching unit can stitch the images of the direct-transformation regions on the basis of camera initial condition information that is information indicating initial conditions of the plurality of camera modules, stitch the images of the overlapping regions on the basis of a composition condition estimated by the use of the images of the overlapping regions, and stitch the images of the buffer regions on the basis of the camera initial condition and the composition condition.

The stitching unit can stitch the images of the buffer regions on the basis of a value, the value being determined by the use of the camera initial condition and the composition condition.

The images of the buffer regions are divided in several stages in an X-, Y-direction.

The signal processing circuit can further include a composition-condition estimation unit that estimates the composition condition by the use of the images of the overlapping regions.

An imaging apparatus according to the first aspect of the present technology includes: a plurality of camera modules; and a signal processing circuit including an image segmentation unit that segments a plurality of photographic images, which are acquired by a plurality of camera modules such that each of the plurality of photographic images includes an overlapping region in a photographic range of each of the plurality of camera modules, into an image of the overlapping region, an image of a direct-transformation region that is a non-overlapping region, and an image of a buffer region provided between the overlapping region and the direct-transformation region, and a stitching unit that stitches the images of the overlapping regions, stitches the images of the direct-transformation regions, and stitches the images of the buffer regions, the images of the overlapping regions, the images of the direct-transformation regions, and the images of the buffer regions being segmented by the image segmentation unit.

A signal processing circuit according to a second aspect of the present technology includes: a storage unit that stores a plurality of photographic images, which are acquired by a plurality of camera modules such that each of the plurality of photographic images includes an overlapping region in a photographic range of each of the plurality of camera modules, and an image of the overlapping region, which has a resolution higher than a resolution of each of the photographic images; a composition-condition estimation unit that estimates the composition condition by the use of the image of the overlapping region; and a stitching unit that stitches the plurality of photographic images on the basis of the composition condition estimated by the composition-condition estimation unit.

The image of the overlapping region is RAW data, and the composition-condition estimation unit estimates the composition condition by the use of the RAW data of the image of the overlapping region.

The image of the overlapping region is an image having a high frame rate, and the composition-condition estimation unit can estimate the composition condition by the use of the image of the overlapping region, which has a high frame rate, and can estimate inter-frame synchronization involving frame interpolation.

The signal processing circuit further includes a frame interpolation unit that performs frame interpolation of one of the photographic images by the use of the image having a high frame rate, in which the frame interpolation unit can perform, on the basis of the inter-frame synchronization estimated by the composition-condition estimation unit, frame interpolation of the one of the photographic images by the use of the image having a high frame rate.

The storage unit stores images of a plurality of overlapping regions, which are based on different exposure conditions, and the composition-condition estimation unit can estimate the composition condition by the use of the images of the plurality of overlapping regions, which are based on the different exposure conditions.

The storage unit stores images of a plurality of overlapping regions, which have different resolutions, and the composition-condition estimation unit can estimate the composition condition by the use of the images of the plurality of overlapping regions, which have different resolutions.

The signal processing circuit further includes a reception unit that receives low-resolution data items of the plurality of photographic images and the image of the overlapping region and receives high-resolution data items of the plurality of photographic images, the low-resolution data items of the plurality of photographic images and the image of the overlapping region being transmitted preceding the high-resolution data items of the plurality of photographic images, in which the stitching unit can stitch the low-resolution data items of the plurality of photographic images on the basis of the composition condition estimated by the composition-condition estimation unit, and thereafter stitch the high-resolution data items of the plurality of photographic images.

An imaging apparatus according to the second aspect of the present technology includes: a plurality of camera modules; and a signal processing circuit including a storage unit that stores a plurality of photographic images, which are acquired by a plurality of camera modules such that each of the plurality of photographic images includes an overlapping region in a photographic range of each of the plurality of camera modules, and an image of the overlapping region, which has a resolution higher than a resolution of each of the photographic images, a composition-condition estimation unit that estimates the composition condition by the use of the image of the overlapping region, and a stitching unit that stitches the plurality of photographic images on the basis of the composition condition estimated by the composition-condition estimation unit.

The image of the overlapping region is an image having a high frame rate, and the composition-condition estimation unit can estimate the composition condition by the use of the image of the overlapping region, which has a high frame rate, and estimate inter-frame synchronization involving frame interpolation.

In the first aspect of the present technology, each of a plurality of photographic images, which are acquired by a plurality of camera modules such that each of the plurality of photographic images includes an overlapping region in a photographic range of each of the plurality of camera modules, is segmented into an image of the overlapping region, an image of a direct-transformation region that is a non-overlapping region, and an image of a buffer region provided between the overlapping region and the direct-transformation region. Then, the segmented images of the overlapping regions are stitched, the segmented images of the direct-transformation regions are stitched, and the segmented images of the buffer regions are stitched.

In the second aspect of the present technology, a plurality of photographic images, which are acquired by a plurality of camera modules such that each of the plurality of photographic images includes an overlapping region in a photographic range of each of the plurality of camera modules, and an image of the overlapping region, which has a resolution higher than a resolution of each of the photographic images are stored. Then, the composition condition is estimated by the use of the image of the overlapping region, and the plurality of photographic images are stitched on the basis of the composition condition estimated by the composition-condition estimation unit.

Advantageous Effects of Invention

In accordance with the present technology, it is possible to stitch a plurality of images including an overlapping region. In particular, in accordance with the present technology, it is possible to accurately stitch a plurality of images including an overlapping region.

Note that the effects described herein are merely examples, effects of the present technology are not limited to the effects described herein, and additional effects may be provided.

BRIEF DESCRIPTION OF DRAWINGS

FIGS. 1A, 1B and 1C A diagram showing configuration examples of outer appearances of camera modules of an imaging apparatus to which the present technology is applied.

MODE(S) FOR CARRYING OUT THE INVENTION

Hereinafter, embodiments for carrying out the present disclosure (hereinafter, referred to as embodiments) will be described. Note that the descriptions will be made in the following order.
1. First Embodiment (Example of 3-Region Division)
2. Second Embodiment (Example of RAW data use)
3. Third Embodiment (Example of plurality of exposure conditions)
4. Fourth Embodiment (Example of Transmission)
5. Fifth Embodiment (Example of High-Frame Rate Image)
6. Sixth Embodiment (Computer)

<First Embodiment (Example of 3-Region Division)>
<Configuration Examples of Outer-Appearances of Camera Modules>

FIGS. 1A, 1B and 1C are diagrams showing configuration examples of outer appearances of camera modules of an imaging apparatus of the present technology. FIG. 1A is a perspective view. FIG. 1B is a perspective view as viewed from the front. FIG. 1C is a view as viewed from below. For example, in the example of FIG. 1A, those surrounding circles are lens holes and lens outer shapes are shown. Further, those extending long from the right are flexible printed circuits.

An imaging apparatus 1 includes two camera modules 11-1 and 11-2. As shown in FIG. 1C, it is configured such that they are bonded and fixed such that angle-of-view starting points of lenses overlap each other and photographic ranges partially overlap each other. Note that, in any of embodiments discussed below, in the imaging apparatus 1, imaging is performed by the two camera modules 11-1 and 11-2 having such a configuration that the angle-of-view starting points of the lenses overlap each other and the photographic ranges partially overlap each other.

The camera modules 11-1 and 11-2 each have a horizontal angle-of-view of 80 degrees. An overlapping region of the two camera modules 11-1 and 11-2 is set to 8 degrees in a horizontal direction. In this case, the horizontal angle-of-view after stitching processing (stitching) becomes about 150 degrees.

Note that, hereinafter, the camera modules 11-1 and 11-2 will be simply referred to as camera modules 11 unless distinguished. Further, the camera modules 11 are not limited to the two camera modules and may be three or more camera modules.

<Configuration Example of Imaging Apparatus>

Figure 2:
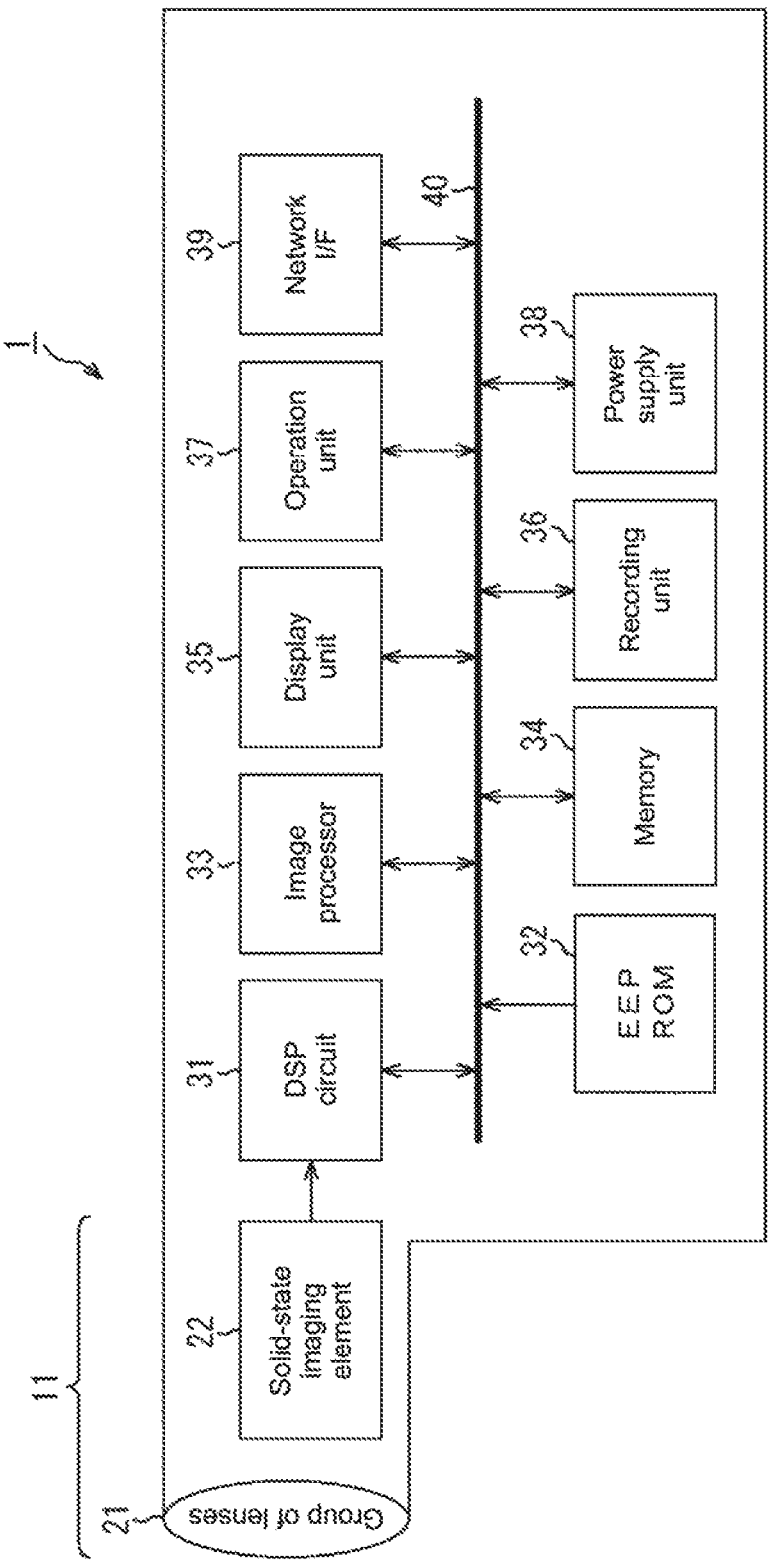
FIG. 2 A block diagram showing a configuration example of the imaging apparatus.

FIG. 2 is a block diagram showing a configuration example of an imaging apparatus to which the present technology is applied. In the example of FIG. 2, an example of the imaging apparatus is shown. This imaging apparatus uses two or more camera modules and performs stitching processing on photographic images, to thereby enlarge a photographic angle-of-view.

The imaging apparatus 1 of FIG. 2 includes an optical unit 21 and a solid-state imaging element (imaging device) 22, which constitute the above-mentioned camera module 11, and a DSP circuit 31 that is a camera signal processing circuit. Further, the imaging apparatus 1 also includes an EEPROM 32, an image processor 33, a memory 34, a display unit 35, a recording unit 36, an operation unit 37, a power supply unit 38, and a network I/F 39. The DSP circuit 31, the EEPROM 32, the image processor 33, the memory 34, the display unit 35, the recording unit 36, the operation unit 37, the power supply unit 38, and the network I/F 39 are connected to one another via a bus line 40.

The optical unit 21 is formed of a group of lenses. The optical unit 21 takes incident light (image light) from an object into inside and causes the incident light (image light) to be imaged on an imaging surface of the solid-state imaging element 22. The solid-state imaging element 22 converts an amount of light of the incident light, which is imaged on the imaging surface by the optical unit 21, into electrical signals pixel by pixel. Then, the solid-state imaging element 22 outputs them as pixel signals.

The EEPROM 32 stores information (referred to as camera initial condition information) indicating initial conditions of the camera modules, which is added to images, such as information on directions of the camera modules 11. The information on the directions of the camera modules 11 is indicated by pitch, yaw, and roll associated with rotations on x-, y-, z-axes, for example. Examples of such information include values recorded upon factory shipment and values analyzed from an image obtained by capturing a particular chart for correction.

The image processor 33 is, for example, constituted of LSI dedicated to image processing. The image processor 33 performs processing associated stitching on images to generate a panoramic image, for example. The memory 34 is, for example, constituted of a frame memory. The memory 34 saves images from the DSP circuit 31, images to be processed by the image processor 33, and the like.

The display unit 35 is, for example, a panel-type display apparatus such as a liquid-crystal panel and an organic EL (Electro Luminescence) panel. The display unit 35 displays moving images or still images captured by the solid-state imaging element 22. The recording unit 36 records the moving images or still images captured by the solid-state imaging element 22 on a recording medium such as a videotape and a DVD (Digital Versatile Disk).

The operation unit 37 issues operation commands regarding various functions of the imaging apparatus 1 according to operations made by a user. The power supply unit 38 appropriately supplies various power supplies to the DSP circuit 31, the EEPROM 32, the image processor 33, the memory 34, the display unit 35, the recording unit 36, the operation unit 37, and the network I/F 39 that are supply targets, the various power supplies being operation power supplies therefor.

The network I/F 39 communicates with other imaging apparatuses 1, servers, etc. in a wireless manner or via the Internet.

<Configuration Example of Image Processor>

Figure 3:
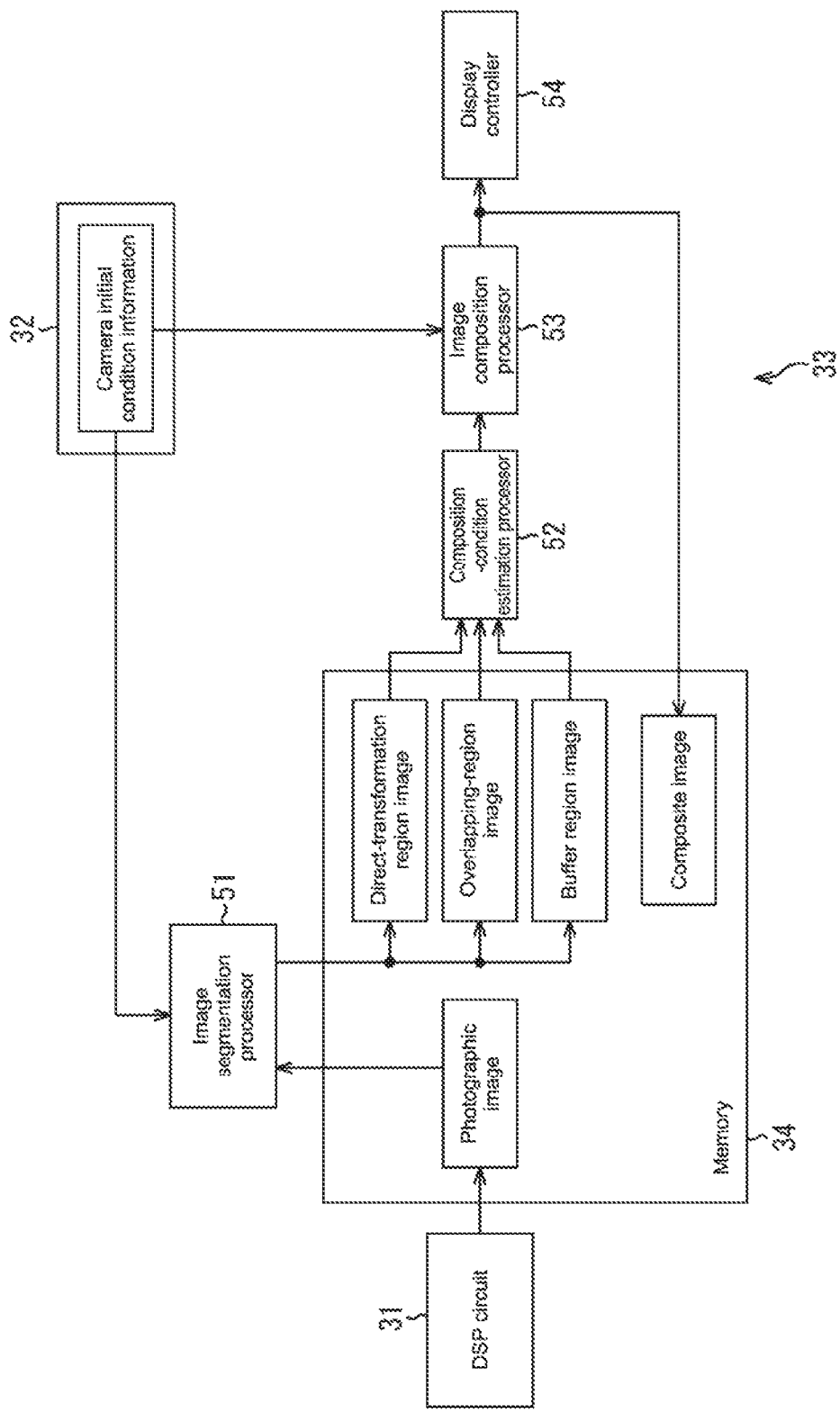
FIG. 3 A block diagram showing a functional configuration example of an image processor.

FIG. 3 is a block diagram showing a functional configuration example of the image processor.

In the example of FIG. 3, the image processor 33 includes an image segmentation processor 51, a composition-condition estimation processor 52, an image composition processor 53, and a display controller 54.

Photographic images from the DSP circuit 31 are recorded in the memory 34. The image segmentation processor 51 reads out the photographic images from the memory 34 and segments or divides each of the read-out photographic images into a direct-transformation region, an overlapping region, and a buffer region. The image segmentation processor 51 records, on the basis of the camera initial condition information stored in the EEPROM 32, direct-transformation region images, overlapping-region images, and buffer region images in the memory 34.

The composition-condition estimation processor 52 reads out the direct-transformation region images, the overlapping-region images, and the buffer region images from the memory 34 and estimates a composition condition by the use of the overlapping-region images out of them. The composition-condition estimation processor 52 supplies the estimated composition condition, the direct-transformation region images, the overlapping-region images, and the buffer region images to the image composition processor 53.

The image composition processor 53 is constituted of, for example, a computing apparatus having a function of concurrent computing processing, such as a GPU. The image composition processor 53 performs, on the basis of the camera initial condition information stored in the EEPROM 32, composition processing with respect to the direct-transformation region images. The image composition processor 53 performs composition processing with respect to the overlapping-region images by the use of the composition condition from the composition-condition estimation processor 52. In addition, the image composition processor 53 performs composition processing with respect to the buffer region images by the use of the camera initial condition and the composition condition to generate a composite image. The image composition processor 53 records the generated composite image in the memory 34 and outputs it to the display controller 54.

The display controller 54 causes a display unit such as an LCD to display the composite image.

<General Composition Processing>

Figure 4A:
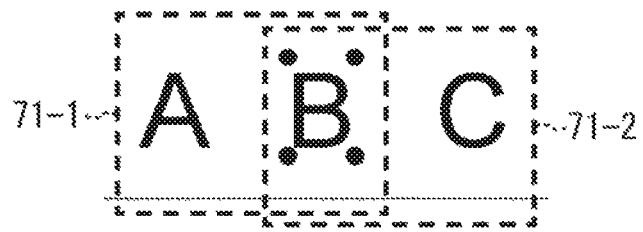
FIGS. 4A, 4B and 4C A diagram describing general stitching processing.
Figure 4B:
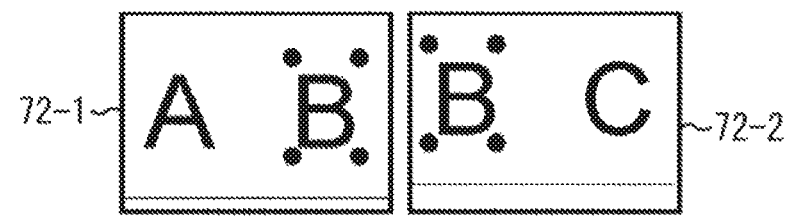
Figure 4C:
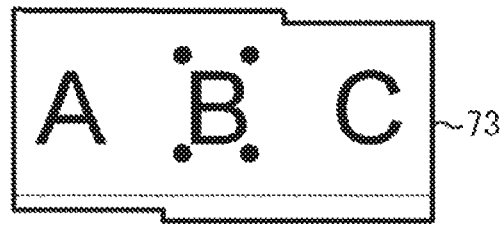

Next, general stitching processing for generating a panoramic image (composite image) will be described with reference to FIGS. 4A, 4B and 4C. In the example of FIGS. 4A, 4B and 4C, the black points indicate feature points.

In the example of FIG. 4A, the characters, A, B, and C from the left and a horizontal line below those characters are shown as exemplary objects. Further, in the example of FIG. 4A, with respect to those objects, a photographic region 71-1 (dotted line) of a camera module 11-1 and a photographic region 71-2 (dotted line) of a camera module 11-2 are shown. As shown by photographic regions 71-1 and 71-2 of FIG. 4A, the photographic regions are offset from each other in upper and lower directions, for example.

A photographic image 72-1 of FIG. 4B is an image captured by the camera module 11-1 with respect to the photographic region 71-1. A photographic image 72-2 of FIG. 4B is an image captured by the camera module 11-2 with respect to the photographic region 71-2.

Those photographic images 72-1 and 72-2 are input and stitching processing is performed. For example, first of all, in the photographic images 72-1 and 72-2, image distortion such as distortion and shading specific to the camera modules, is corrected and the corrected images are subjected to projective deformation corresponding to imaging directions of the camera modules 11-1 and 11-2.

Next, as shown in FIG. 4B, feature points (e.g., four black points in figure) within an overlapping region that is a region overlapping between the photographic images 72-1 and 72-2 are extracted and the corresponding points are searched for. Then, a composition condition is analyzed such that the positions of the corresponding points approximate to each other. After that, the images after the projective deformation are deformed (warped) in a manner that depends on desired projection type such as cylindrical projection.

Finally, processing called blending, for example, smoothing discontinuous luminance signals of the overlapping region, is performed for making duplicate image signals unremarkable. As a result of the general stitching processing as described above, a composite image 73 is generated as shown in FIG. 4C.

<Outline of Present Technology>

Figure 5A:
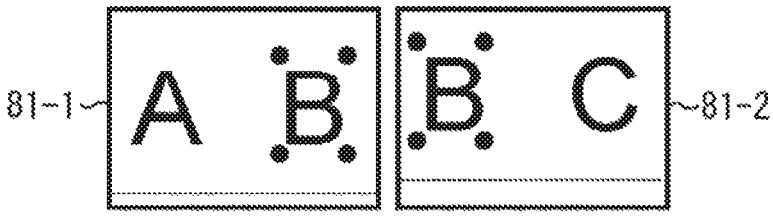
FIGS. 5A, 5B and 5C A diagram describing influence of errors in feature point extraction.
Figure 5B:
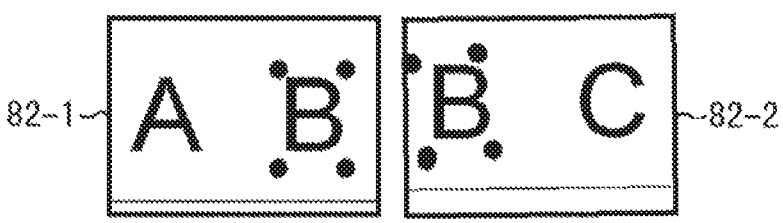
Figure 5C:
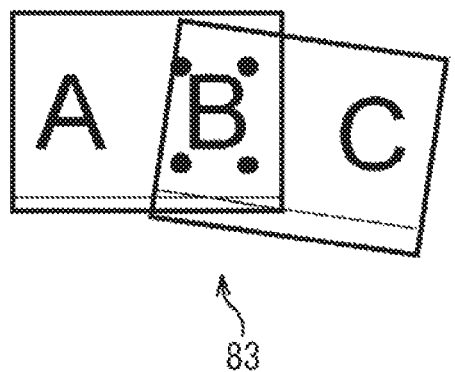

Next, influence of errors in the feature point extraction will be described with reference to FIGS. 5A, 5B and 5C. As shown in FIG. 5A, there is no problem when feature points (four black points in figure) extracted within an overlapping region of photographic images 81-1 and 81-2 are relatively correct (have substantially no errors).

In some cases, the overlapping region is made smaller for widening the photographic angle-of-view after stitching. At this time, if feature points (four black points in figure) extracted within the overlapping region of the photographic images 82-1 and 82-2 has errors as shown in FIG. 5B, the errors between the feature points may remarkably appear on an opposite side of the overlapping region as in a composite image 83 shown in FIG. 5C.

In particular, with moving images, when such errors change per frame, an angle-of-view of an entire image slightly and quickly changes, which causes disagreeable sensations in viewing.

Figure 6:
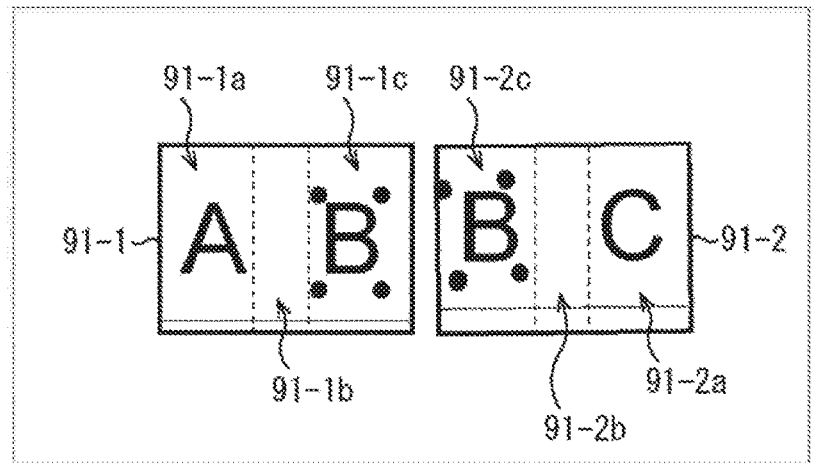
FIG. 6 A diagram describing an example of divided regions of photographic images.

In view of this, in the present technology, as shown in FIG. 6, a photographic image 91-1 is divided into a direct-transformation region 91-1a, a buffer region 91-1b, and an overlapping region 91-1c and input into the image processor 33. Similarly, a photographic image 91-2 is divided into a direct-transformation region 91-2a, a buffer region 91-2b, and an overlapping region 91-2c and input into the image processor 33.

Here, the overlapping region is a region overlapping between the photographic ranges of the camera modules. The direct-transformation region is a non-overlapping region. More specifically, the direct-transformation region is a region transformed using only an image thereof during stitching. The buffer region is a non-overlapping region. More specifically, the buffer region is a region set between the overlapping region and the direct-transformation region.

For allocation of the regions, suitable values can be set in a manner that depends on an optical design for lenses and an object. For example, when the overlapping regions 91-1c and 91-2c are each set to 10% of the photographic angle-of-view, each of the direct-transformation regions 91-1a and 91-2a is 50% and each of the buffer regions 91-1b and 91-2b is 40%. In the present technology, the overlapping region is made as narrow as possible.

Figure 7:
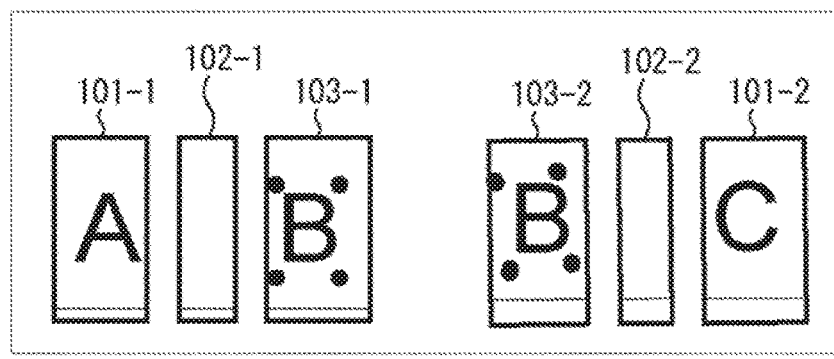
FIG. 7 A diagram showing an example of divided images.

A direct-transformation region image 101-1, a buffer region image 102-1, and an overlapping-region image 103-1 are, as shown in FIG. 7, input into the image processor 33 as the photographic image 91-1. Further, a direct-transformation region image 101-2, a buffer region image 102-2, and an overlapping-region image 103-2 are, as shown in FIG. 7, input into the image processor 33 as the photographic image 91-2.

Then, in the image processor 33, with respect to each of the divided regions, processing associated with stitching corresponding to that region is performed. Hereinafter, stitching according to the present technology will be described in detail.

Figure 8:
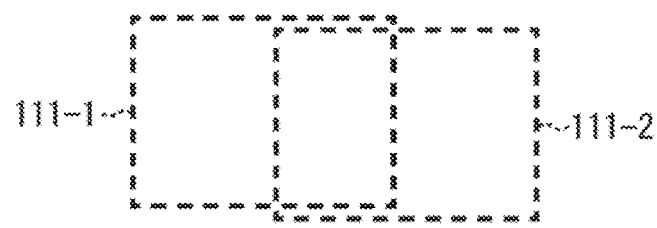
FIG. 8 A diagram describing stitching processing of the present technology.

In the example of FIG. 8, templates 111-1 and 111-2 for stitching are shown. The templates 111-1 and 111-2 are determined on the basis of the camera initial condition information stored in the EEPROM 32.

Figure 9A:
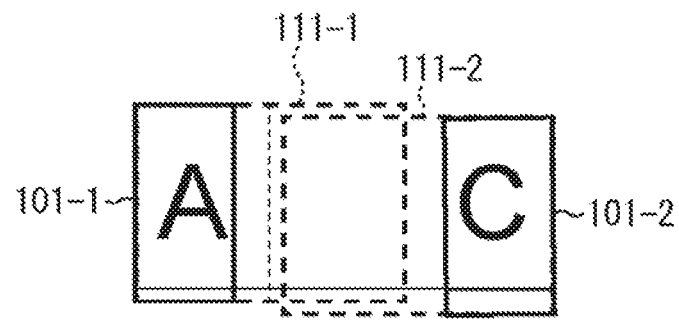
FIGS. 9A, 9B and 9C A diagram describing the stitching processing of the present technology.

Stitching (projective transformation and warping) is performed on the direct-transformation region images 101-1 and 101-2 on the basis of the camera initial condition information stored in the EEPROM 32 (information on directions of camera modules). As a result, the direct-transformation region images 101-1 and 101-2 are combined so as to respectively fit in the templates 111-1 and 111-2 as shown in FIG. 9A.

Figure 9B:
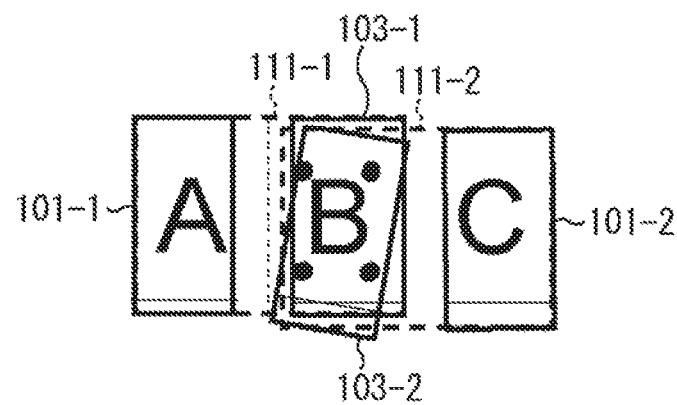

As described above with reference to FIGS. 4A, 4B and 4C, stitching is performed on the overlapping-region images 103-1 and 103-2 on the basis of a composition condition acquired from the overlapping-region images 103-1 and 103-2. As a result, the overlapping-region images 103-1 and 103-2 are combined such that at least feature points thereof fit in an overlapping region of the templates 111-1 and 111-2 as shown in FIG. 9B.

Note that the processing on the direct-transformation region images 101-1 and 101-2 and the processing on the overlapping-region images 103-1 and 103-2 can be concurrently performed. Therefore, the image processing therefor may be performed by, for example, a computing apparatus having a concurrent computing processing function, such as a GPU.

Figure 9C:
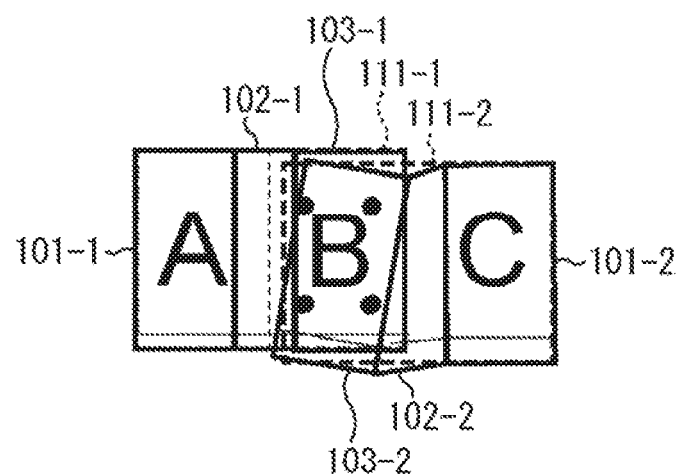

Stitching is performed on the buffer region images 102-1 and 102-2 by the use of a value (e.g., moderate value), the value being determined on the basis of a projective transformation condition of the direct-transformation region images 101-1 and 101-2 and a projective transformation condition of the overlapping-region images 103-1 and 103-2. As a result, the image of the buffer region image 102-1 is combined so as to fit between the direct-transformation region image 101-1 and the overlapping-region image 103-1 and connect them as shown in FIG. 9C. Similarly, the image of the buffer region image 102-2 is combined so as to fit between the direct-transformation region image 101-2 and the overlapping-region image 103-2 and connect them as shown in FIG. 9C.

Note that, by dividing the buffer region images 102-1 and 102-2 in several stages in an X-, Y-direction, a difference between the projective transformation condition of the direct-transformation region images 101-1 and 101-2 and the projective transformation condition of the overlapping-region images 103-1 and 103-2 can be smoothed.

<Example of Image Processing>

Figure 10:
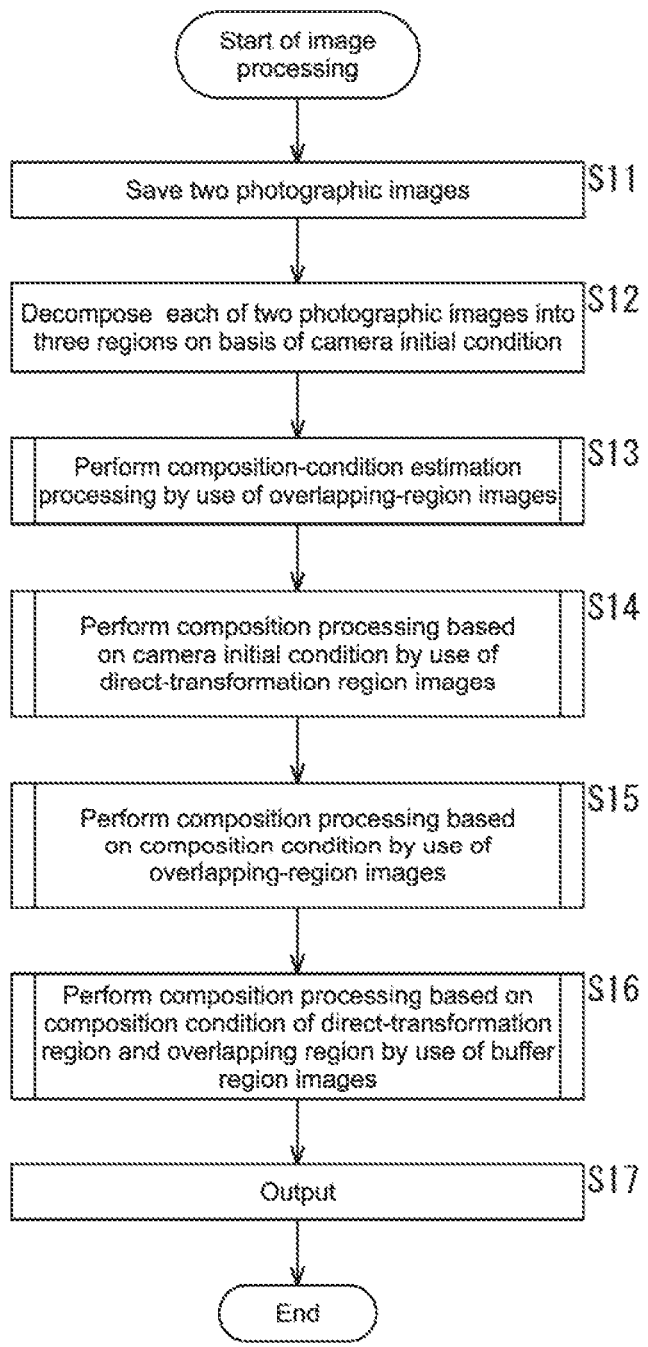
FIG. 10 A flowchart describing image processing of the image processor of FIG. 3.

Next, stitching processing that is one process of the image processing of the imaging apparatus 1 will be described with reference to the flowchart of FIG. 10.

The DSP circuit 31 converts captured luminance signals into images and causes the memory 34 to save them. The memory 34 saves two photographic images in Step S11. The two photographic images are images captured by the camera modules 11-1 and 11-2.

In Step S12, the image segmentation processor 51 reads out the two photographic images from the memory 34 and divides the read-out photographic images into direct-transformation regions, overlapping regions, and buffer regions on the basis of the camera initial condition information stored in the EPROM 32. The image segmentation processor 51 records, in the memory 34, the divided direct-transformation region images, overlapping-region images, and buffer region images.

The composition-condition estimation processor 52 reads out, from the memory 34, the direct-transformation region images, the overlapping-region images, and the buffer region images and, in Step S13, performs composition-condition estimation processing by the use of the overlapping-region images out of them. Details of this composition-condition estimation processing will be described later with reference to FIG. 11.

A composition condition is estimated in Step S13. Then, the composition-condition estimation processor 52 supplies the estimated composition condition, the direct-transformation region images, the overlapping-region images, and the buffer region images to the image composition processor 53.

In Step S14, the image composition processor 53 performs composition processing based on the camera initial condition information stored in the EEPROM 32 by the use of the direct-transformation region images. Details of this composition processing will be described later with reference to FIG. 12.

In Step S14, the direct-transformation region images 101-1 and 101-2 are combined as shown in FIG. 9A.

In Step S15, the image composition processor 53 performs composition processing based on the composition condition, which is estimated in Step S16, by the use of the overlapping-region images. Note that, regarding this composition processing, the images used therefor and the condition on which it is based are merely different and it is basically the same as the composition processing of FIG. 12 to be described later. Therefore, descriptions thereof will be omitted.

In Step S15, the overlapping-region images 103-1 and 103-2 are combined as shown in FIG. 9B.

Note that the processes of Steps S14 and S15 may be concurrently performed.

In Step S16, the image composition processor 53 performs composition processing based on the composition condition (e.g., moderate condition) of the direct-transformation regions and the overlapping regions by the use of the buffer region images. Note that, also regarding this composition processing, the images used therefor and the condition on which it is based are merely different and it is basically the same as the composition processing of FIG. 12 to be described later. Therefore, descriptions thereof will be omitted.

In Step S16, the buffer region images 102-1 and 102-2 are combined as shown in FIG. 9C. That is, the buffer region image 102-1 is combined so as to fit between the direct-transformation region image 101-1 and the overlapping-region image 103-1 and connect them as shown in FIG. 9C.

Similarly, the buffer region image 102-2 is combined so as to fit between the direct-transformation region image 101-2 and the overlapping-region image 103-2 and connect them as shown in FIG. 9C.

A composite image is generated in the above-mentioned manner. Therefore, in Step S17, the image composition processor 53 records the generated composite image in the memory 34 and outputs it to the display controller 54. The display controller 54 causes the display unit 35 to display the composite image.

Figure 11:
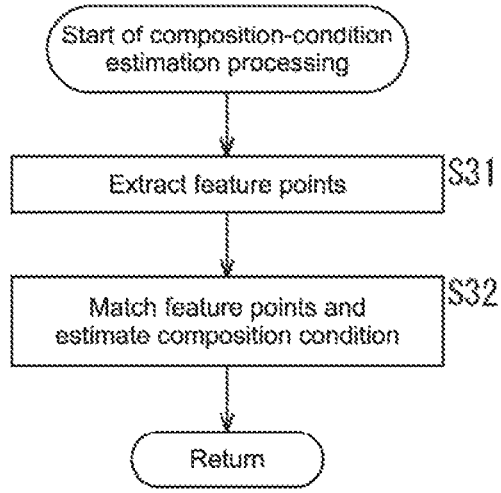
FIG. 11 A flowchart describing composition-condition estimation processing.

Next, the composition-condition estimation processing of Step S13 of FIG. 10 will be described with reference to the flowchart of FIG. 11.

In Step S31, the composition-condition estimation processor 52 extracts feature points by the use of the overlapping-region images. In Step S32, the composition-condition estimation processor 52 matches the extracted feature points and estimates a composition condition.

Figure 12:
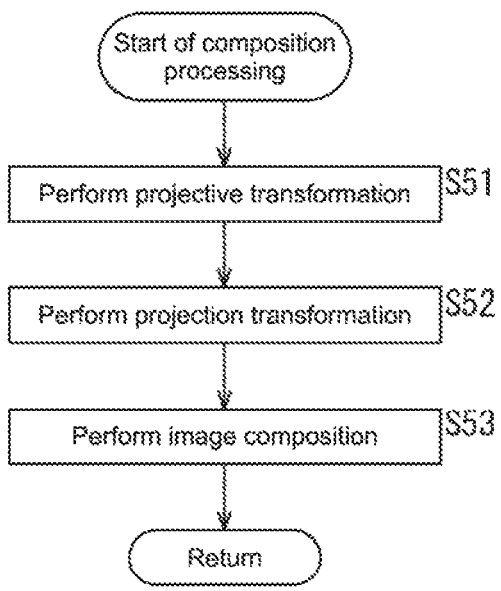
FIG. 12 A flowchart describing composition processing.

Next, the composition processing of Step S14 of FIG. 10 will be described with reference to the flowchart of FIG. 12. Note that this processing is an example in the case of the direct-transformation region images and is performed by the use of the direct-transformation region images on the basis of the camera initial condition information stored in the EEPROM 32.

In Step S51, the image composition processor 53 performs projective transformation by the use of the direct-transformation region images on the basis of the camera initial condition information. In Step S52, the image composition processor 53 performs projective transformation. In Step S53, the image composition processor 53 performs image composition. By the above-mentioned processing, the direct-transformation region images are combined as shown in FIG. 9A.

As described above, each of the images is divided into the three regions and composition processing corresponding to each region is performed. Therefore, it is possible to fix the angle-of-view after stitching and enhance the accuracy of the image after stitching.

The calculation capacity for the overlapping region and the buffer region can be reduced. In addition, the division of the image enables concurrent processing to be performed. Therefore, the speed of the processing can be increased.

<Second Embodiment (Example of RAW Data Use)>
<Configuration Example of Image Processor>

Figure 13:
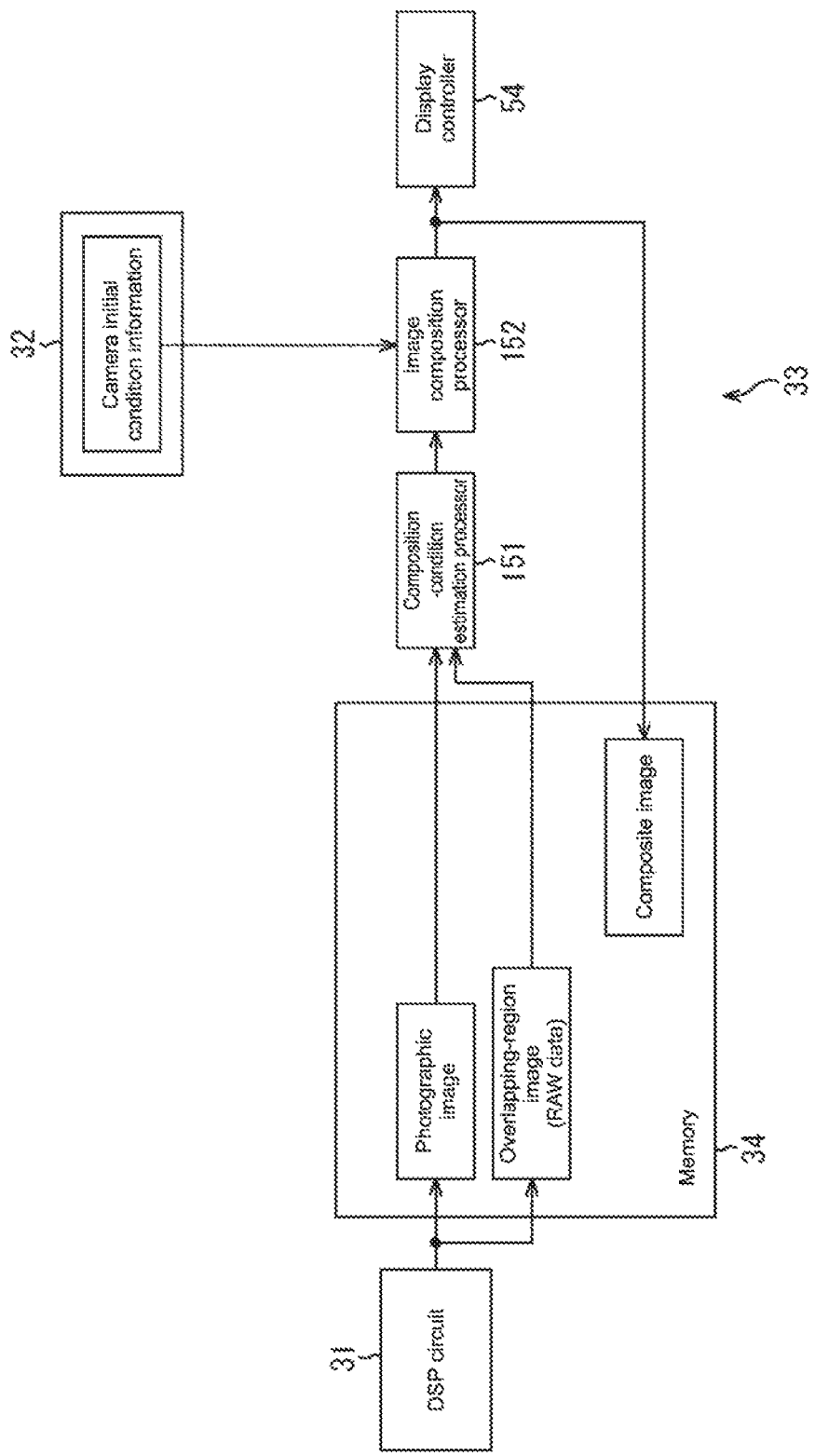
FIG. 13 A block diagram showing another functional configuration example of the image processor.

FIG. 13 is a block diagram showing another example of the functional configuration of the image processor.

An image processor 33 of FIG. 13 is common to the image processor of FIG. 3 in that it includes a display controller 54. The image processor 33 of FIG. 13 is different from the image processor 33 of FIG. 3 in that the image segmentation processor 51 is removed, the composition-condition estimation processor 52 is replaced by a composition-condition estimation processor 151, and the image composition processor 53 is replaced by an image composition processor 152.

Photographic images from a DSP circuit 31 are recorded in a memory 34. Further, at this time, the DSP circuit 31 also records RAW data items of overlapping-region images in the memory 34.

The composition-condition estimation processor 151 reads out, from the memory 34, the photographic images and the overlapping-region images (RAW data items) and estimates a composition condition by the use of the RAW data items of the overlapping-region images out of them. The composition-condition estimation processor 151 supplies the estimated composition condition and the photographic images to the image composition processor 152.

The image composition processor 152 performs composition processing with respect to the photographic images by the use of the composition condition from the composition-condition estimation processor 151 to generate a composite image. The image composition processor 152 records the generated composite image in the memory 34 and outputs it to the display controller 54.

Figure 14:
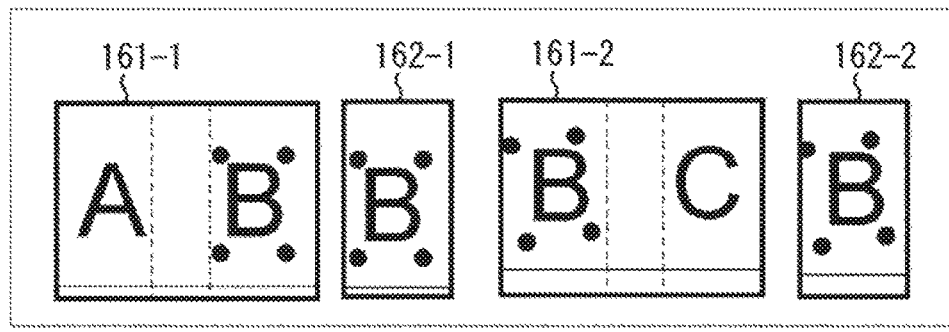
FIG. 14 A diagram describing image data items.

In the image processor 33 of FIG. 13, RAW data items of overlapping-region images 162-1 and 162-2 are also recorded in addition to photographic images 161-1 and 161-2 of FIG. 14. Therefore, the composition-condition estimation processor 52 is capable of generating the composition condition by the use of the RAW data items of the overlapping-region images. With this, the accuracy of the composition condition can be enhanced.

<Example of Image Processing>

Figure 15:
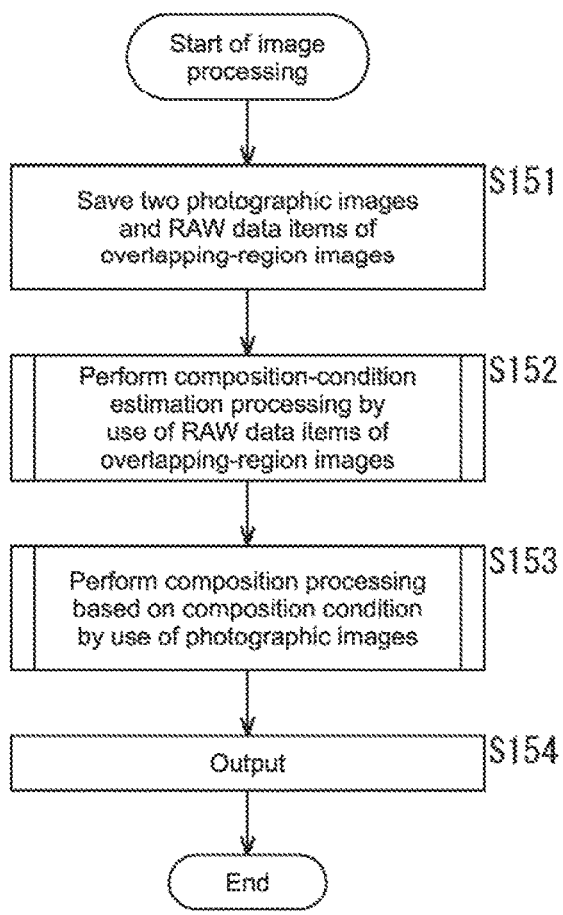
FIG. 15 A flowchart describing image processing of the image processor of FIG. 13.

Next, stitching processing executed by the image processor 33 of FIG. 13 will be described with reference to the flowchart of FIG. 15.

The DSP circuit 31 causes the memory 34 to save two captured photographic images and RAW data items of overlapping-region images thereof. The memory 34 saves, in Step S151, the two photographic images and the image RAW data items of the overlapping regions.

The composition-condition estimation processor 151 reads out, from the memory 34, the photographic images and the overlapping-region images (RAW data items). In Step S152, the composition-condition estimation processor 151 performs composition-condition estimation processing by the use of the RAW data items of the overlapping-region images out of them. Details of this composition-condition estimation processing are different only in that the used data is the RAW data and it is basically the same as the composition-condition estimation processing of FIG. 11. Therefore, descriptions thereof will be omitted.

In Step S152, a composition condition is estimated. Then, the composition-condition estimation processor 151 supplies the estimated composition condition and the photographic images to the image composition processor 152.

In Step S153, the image composition processor 152 performs composition processing based on the composition condition, which is estimated in Step S152, by the use of the photographic images. Note that this composition processing is different only in view of the images used therefor and the condition on which it is based and it is basically the same as the composition processing of FIG. 12. Therefore, descriptions thereof will be omitted.

A composite image is generated in the above-mentioned manner. Therefore, in Step S154, the image composition processor 152 records the generated composite image in the memory 34 and outputs it to the display controller 54. The display controller 54 causes the display unit 35 to display the composite image.

As described above, the RAW data items of the overlapping-region images are saved other than the photographic images and the composition condition based on the RAW data items of the overlapping-region images is generated. With this, the accuracy of the composition condition can be enhanced.

Note that, although the example in which the photographic images are used in the composition processing has been described in the second embodiment, the technology of the second embodiment is also applicable to a case where, as in the first embodiment, each of the photographic images is divided into the three regions and composition processing corresponding to each region is performed.

<Third Embodiment (Example of Plurality of Exposure Conditions)>

<Configuration Example of Image Processor>

Figure 16:
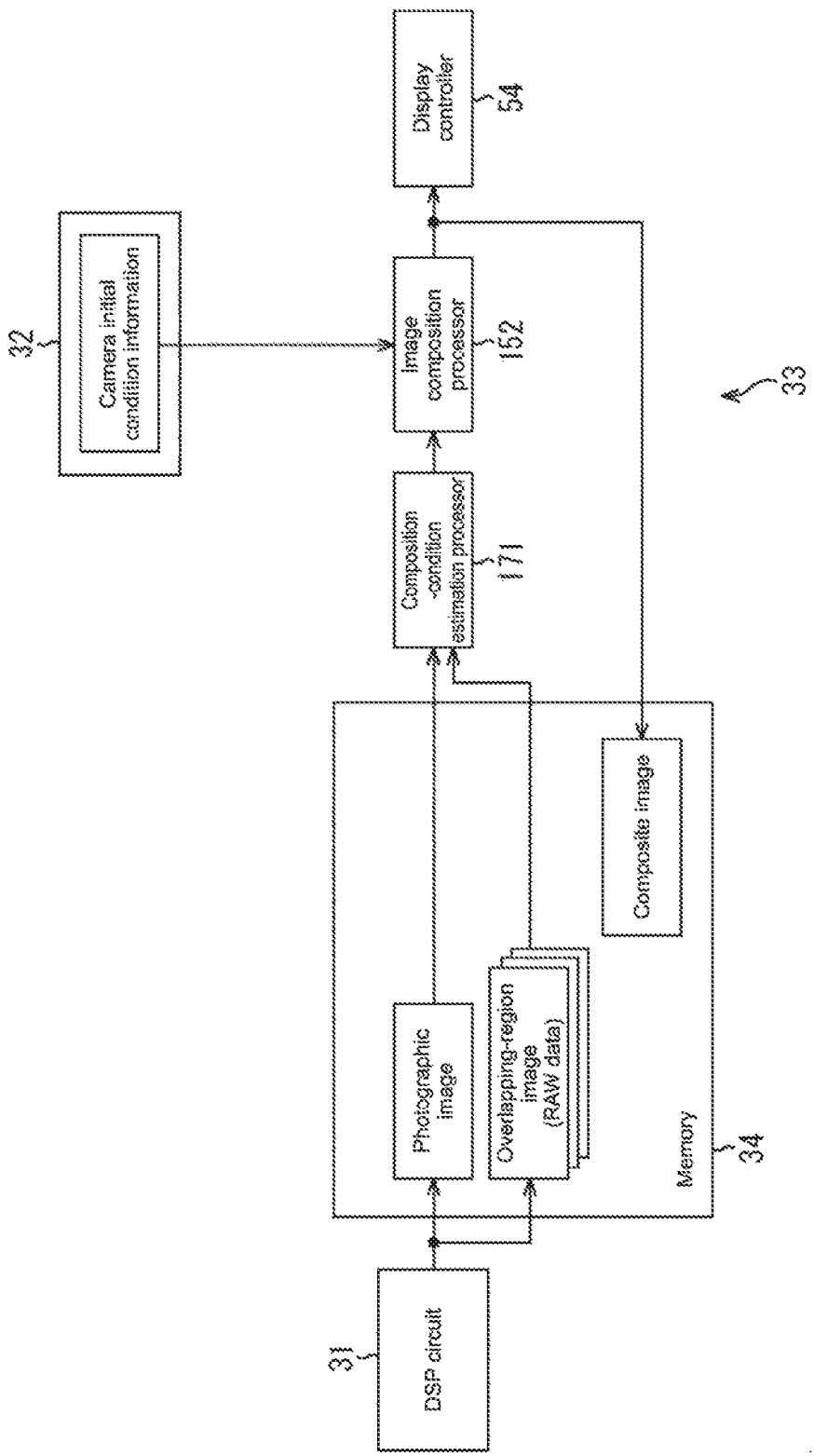
FIG. 16 A block diagram showing another functional configuration example of the image processor.

FIG. 16 is a block diagram showing another example of the functional configuration of the image processor.

An image processor 33 of FIG. 16 is common to the image processor of FIG. 13 in that it includes an image composition processor 152 and a display controller 54. The image processor 33 of FIG. 16 is different from the image processor 33 of FIG. 3 in that the composition-condition estimation processor 151 is replaced by a composition-condition estimation processor 171.

Photographic images from a DSP circuit 31 are recorded in a memory 34. Further, at this time, through bracketing of the camera modules 11, the DSP circuit 31 also records, in the memory 34, RAW data items of a plurality of overlapping region images having different exposure conditions (hereinafter, also referred to as different-exposure overlapping region images).

The composition-condition estimation processor 171 reads out, from the memory 34, the photographic images and the plurality of different-exposure overlapping region images (RAW data items) and estimates a composition condition by the use of the RAW data items of the plurality of different-exposure overlapping region images out of them. The composition-condition estimation processor 171 supplies the estimated composition condition and the photographic images to the image composition processor 152.

The image composition processor 152 performs composition processing with respect to the photographic images by the use of the composition condition from the composition-condition estimation processor 171 to generate a composite image. The image composition processor 152 records the generated composite image in the memory 34 and outputs it to the display controller 54.

Figure 17:
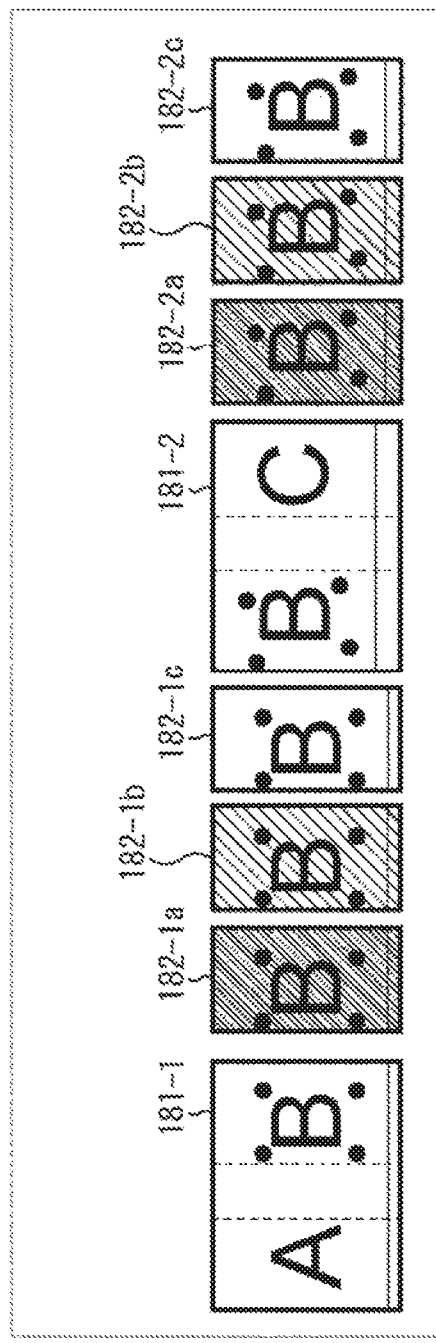
FIG. 17 A diagram describing image data items.

In the image processor 33 of FIG. 16, as shown in FIG. 17, RAW data items 182-1a to 182-1c of the different-exposure overlapping-region images and RAW data items 182-2a to 182-2c of the different-exposure overlapping-region images are recorded in addition to a photographic image 181-1 and a photographic image 181-2.

Therefore, a composition condition based on the RAW data items of the plurality of different-exposure overlapping region images is generated by the composition-condition estimation processor 52. Thus, feature points can be clearly acquired. With this, the accuracy of the composition condition can be enhanced.

Note that, instead of the RAW data items of the different-exposure overlapping-region images, the different-exposure overlapping-region images may be saved and used for the composition-condition estimation processing. Further, instead of those having different exposure conditions, data items of overlapping-region images having different resolutions may be used. Also in this case, the plurality of different-resolution images can make feature points clear. In addition, the difference may be not only the exposure condition or resolution but also other imaging conditions or image quality.

<Example of Image Processing>

Figure 18:
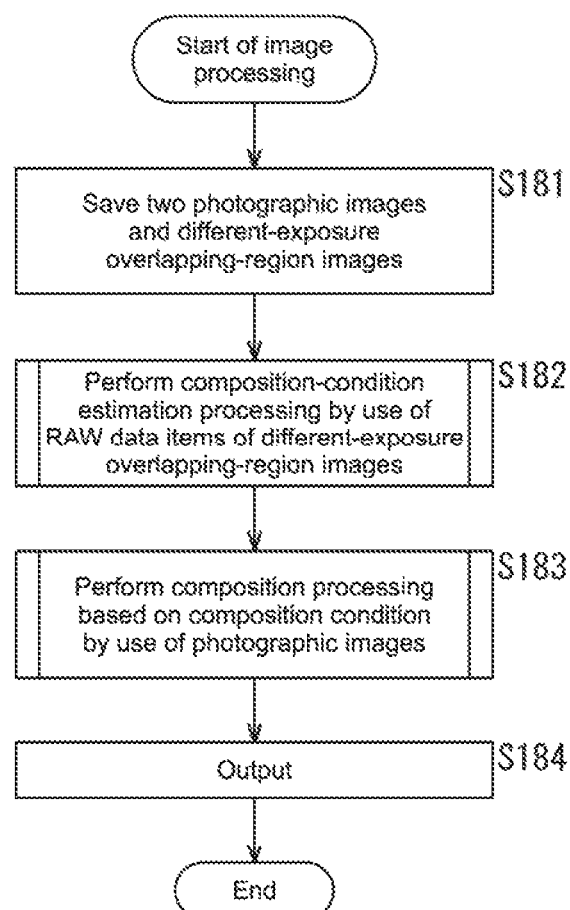
FIG. 18 A flowchart describing image processing of the image processor of FIG. 16.

Next, stitching processing executed by the image processor 33 of FIG. 16 will be described with reference to the flowchart of FIG. 18.

The DSP circuit 31 causes the memory 34 to save two captured photographic images and RAW data items of a plurality of different-exposure overlapping region images. In Step S181, the memory 34 saves the two photographic images and the RAW data items of the plurality of different-exposure overlapping region images.

The composition-condition estimation processor 171 reads out, from the memory 34, the photographic images and the plurality of different-exposure overlapping region images (RAW data items) and, in Step S182, performs composition-condition estimation processing by the use of the RAW data items of the different-exposure overlapping-region images out of them. This composition-condition estimation processing will be described later in detail with reference to FIG. 19.

A composition condition is estimated in Step S182. Then, the composition-condition estimation processor 171 supplies the estimated composition condition and the photographic images to the image composition processor 152.

In Step S183, the image composition processor 152 performs composition processing based on the composition condition, which is estimated in Step S112, by the use of the photographic images. Note that, regarding this composition processing, the images used therefor and the condition on which it is based are merely different and it is basically the same as the composition processing of FIG. 12. Therefore, descriptions thereof will be omitted.

A composite image is generated in the above-mentioned manner. Therefore, in Step S184, the image composition processor 152 records the generated composite image in the memory 34 and outputs it to the display controller 54.

Figure 19:
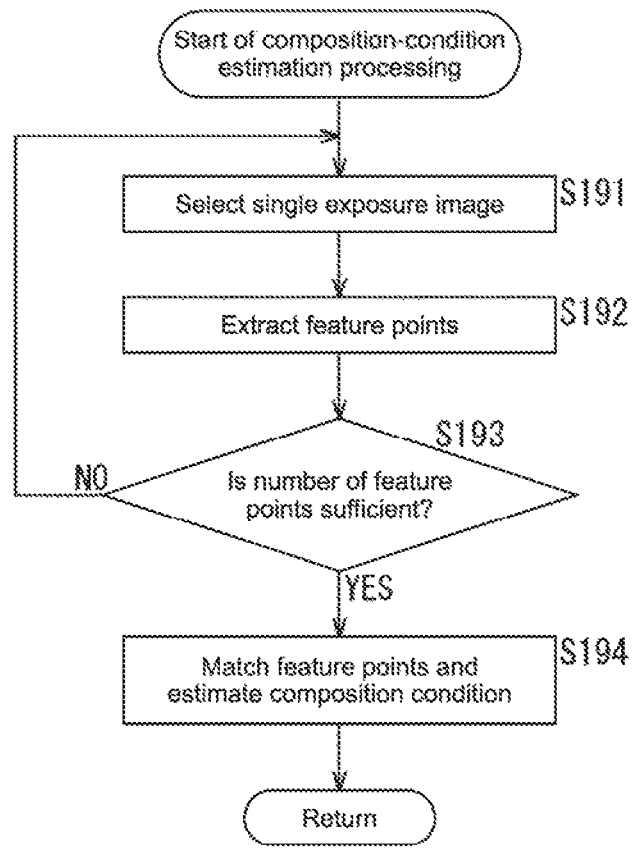
FIG. 19 A flowchart describing composition-condition estimation processing.

Next, composition-condition estimation processing of Step S182 of FIG. 18 will be described with reference to the flowchart of FIG. 19. Note that, in the example of FIG. 19, the different-exposure overlapping-region images will be simply referred to as exposure images.

The composition-condition estimation processor 171 selects one exposure image in Step S191. The composition-condition estimation processor 171 extracts feature points by the use of the selected exposure image in Step S192.

In Step S193, the composition-condition estimation processor 171 determines whether or not the number of extracted feature points is sufficient. When it is, in Step S193, determined that it is not sufficient, the processing returns to Step S191. When it is, in Step S193, determined that it is sufficient, the processing proceeds to Step S194.

In Step S194, the composition-condition estimation processor 171 matches the extracted feature points and estimates a composition condition.

As described above, the RAW data items of the plurality of different-exposure overlapping region images are saved other than the photographic images, and the composition condition based on the RAW data items of the plurality of different-exposure overlapping region images is generated. With this, the accuracy of the composition condition can be further enhanced in comparison with the case of the second embodiment.

Note that, although the example in which the photographic images are used in the composition processing has been described also in the third embodiment, the technology of the third embodiment is applicable to a case where, as in the first embodiment, each of the photographic images is divided into the three regions and composition processing corresponding to each region is performed.

<Fourth Embodiment (Example of Transmission)>

<Configuration Example of System>

Figure 20:
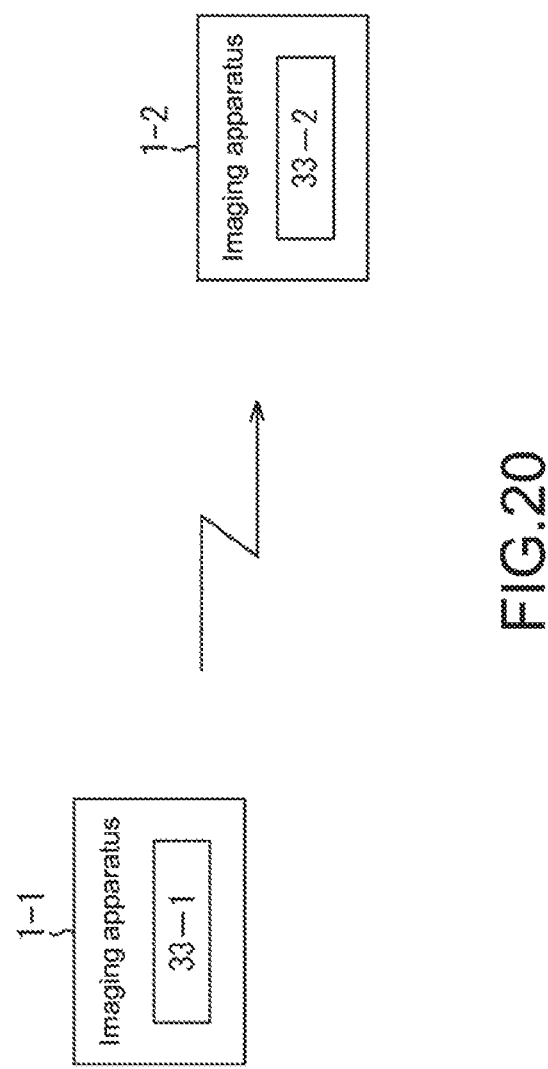
FIG. 20 A block diagram showing a configuration example of an image processing system.

FIG. 20 is a diagram showing a configuration example of an image processing system to which the present technology is applied.

The image processing system of FIG. 20 is constituted of an imaging apparatus 1-1 on a transmitter side and an imaging apparatus 1-2 on a receiver side. For example, both are placed in locations remote from each other.

The imaging apparatuses 1-1 and 1-2 are configured basically similarly to the imaging apparatus 1 of FIG. 2. An image processor 33-1 of the imaging apparatus 1-1 transmits photographic images to the imaging apparatus 1-2. In this transmission, for example, entire images are transmitted with a low resolution and only overlapping-region images are transmitted as RAW data items in advance. Further, high-resolution data items of the entire images are subsequently transmitted.

An image processor 33-2 of the imaging apparatus 1-2 receives the photographic images from the imaging apparatus 1-1. The image processor 33-2 generates a composition condition by the use of the previously received RAW data items of the overlapping-region images. Then, the image processor 33-2 performs composition processing by the use of the subsequently received high-resolution data items of the photographic images by the use of the generated composition condition.

By performing the processing in this way, it is possible to increase the working efficiency in the image processing system of FIG. 20 and to increase the accuracy of stitching.

Note that, in the image processing system of FIG. 20, the receiver side does not necessarily need to be the imaging apparatus and may be an image processing apparatus including the image processor 33-2. Further, although the example in which the RAW data items of the overlapping-region images are received and transmitted has been shown in the example of FIG. 20, the RAW data items of the overlapping-region images may be replaced by high-resolution data items of the overlapping-region images.

<Configuration Example of Image Processor>

Figure 21:
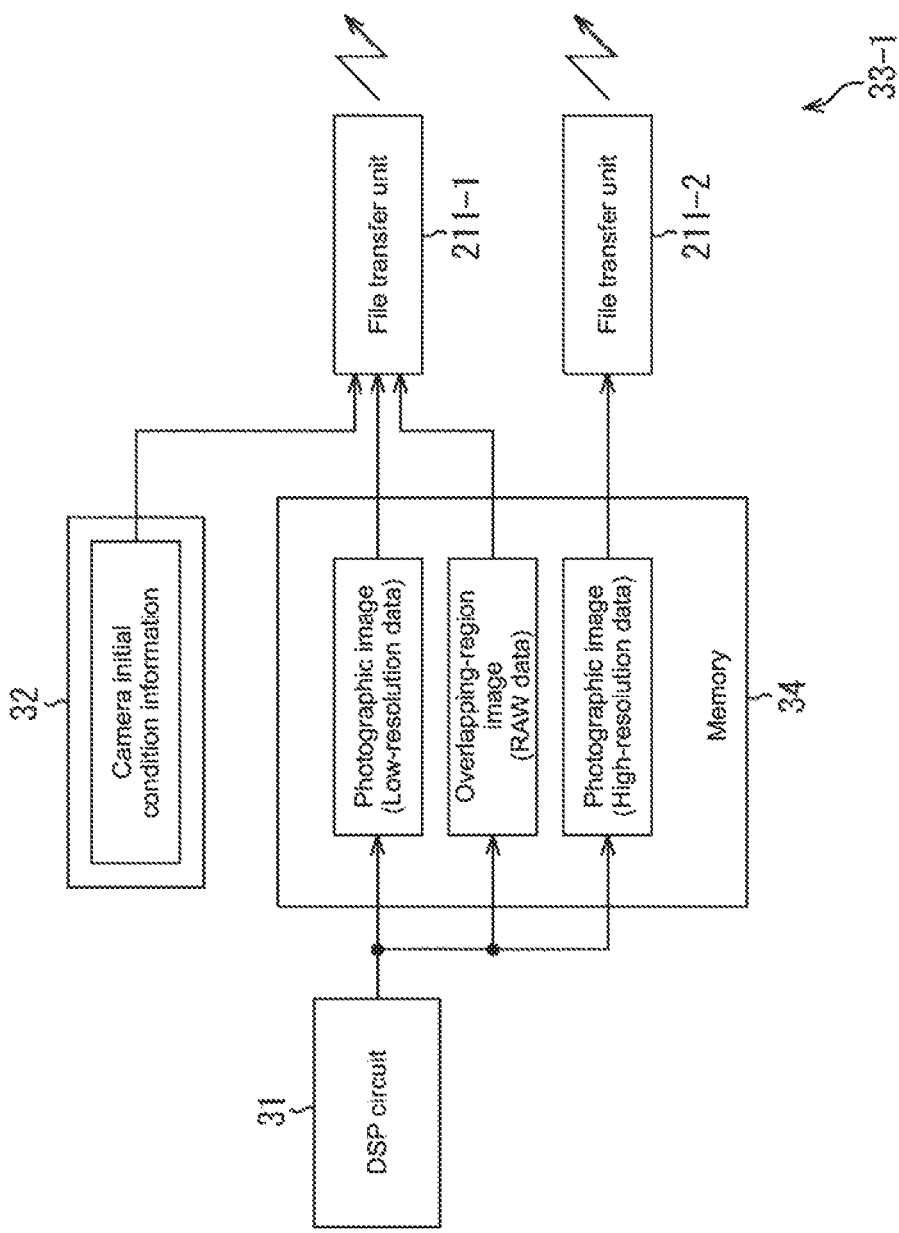
FIG. 21 A block diagram showing another functional configuration example of the image processor on a transmitter side.

FIG. 21 is a block diagram showing another example of the functional configuration of the image processor on the transmitter side.

An image processor 33-1 of FIG. 21 is different from the image processor 33 of FIG. 13 in that the image segmentation processor 51, the composition-condition estimation processor 52, the image composition processor 53, and the display controller 54 are removed and file transfer units 211-1 and 211-2 are added.

Photographic images from a DSP circuit 31 are recorded with a low resolution and a high resolution in a memory 34. Further, at this time, the DSP circuit 31 also records RAW data items of overlapping-region images in the memory 34.

Preceding transmission of the file transfer unit 211-2, the file transfer unit 211-1 transmits the low-resolution data items of the photographic images, the RAW data items of the overlapping-region images, and camera initial condition information of an EEPROM 32 to the image processor 33-2 via a network I/F 39 at once.

Following the transmission of the file transfer unit 211-1, the file transfer unit 211-2 transmits the high-resolution data items of the photographic images to the image processor 33-2 via the network I/F 39.

Figure 22:
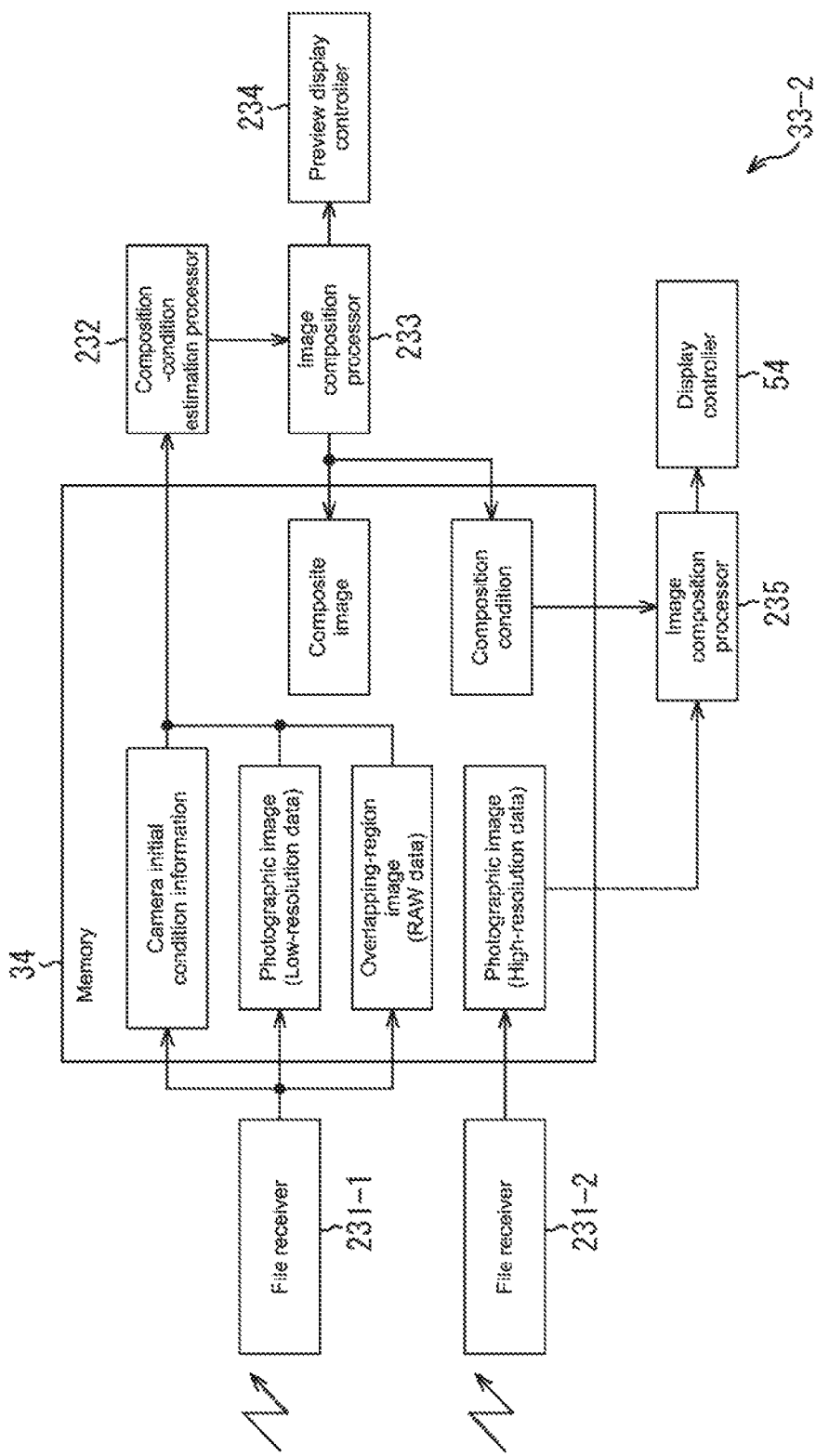
FIG. 22 A block diagram showing another functional configuration example of the image processor on a receiver side.

FIG. 22 is a block diagram showing another example of the functional configuration of the image processor on the receiver side.

An image processor 33-2 of FIG. 22 is common to the image processor 33 of FIG. 13 in that it includes a display processor 54. The image processor 33-2 of FIG. 22 is different from the image processor 33 of FIG. 13 in that the composition-condition estimation processor 52 is replaced by a composition-condition estimation processor 232 and the image composition processor 53 is replaced by image composition processors 233 and 235.

Further, the image processor 33-2 of FIG. 22 is different from the image processor 33 of FIG. 13 in that the image segmentation processor 51 is removed and file receivers 231-1 and 231-2 and a preview display processor 234 are added.

That is, the file receiver 231-1 receives low-resolution data items of photographic images from the image processor 33-1, RAW data items of overlapping-region images, and a camera initial condition information via a network I/F 39, and records them in a memory 34.

Subsequently, the file receiver 231-2 receives high-resolution data items of the photographic images from the image processor 33-2 via the network I/F 39, and records them in the memory 34.

The composition-condition estimation processor 232 reads out, from the memory 34, the camera initial condition information, the low-resolution data items of the photographic images, and the RAW data items of the overlapping-region images, and estimates a composition condition by the use of the RAW data items of the overlapping-region images out of them. The composition-condition estimation processor 232 supplies the estimated composition condition and the low-resolution data items of the photographic images to the image composition processor 233.

The image composition processor 233 performs composition processing with respect to the low-resolution data items of the photographic images by the use of the composition condition to generate a composite image. The image composition processor 233 records the generated composite image in the memory 34 and outputs it to a preview display controller 234. The image composition processor 233 records the composition condition in the memory 34.

The preview display controller 234 causes the display unit 35 to display the composite image with respect to the low-resolution data items of the photographic images. The composite image with respect to the low-resolution data items of the photographic images is used for viewing a thumbnail (preview image) that does not need to have a high resolution.

The image composition processor 235 reads out, from the memory 34, the high-resolution data items of the photographic images and the composition condition and performs composition processing on the high-resolution data items of the photographic images under the read-out composition condition, to generate a composite image. The image composition processor 235 outputs the generated composite image to the display controller 54. The display controller 54 causes the display unit 35 to display the composite image.

Figure 23:
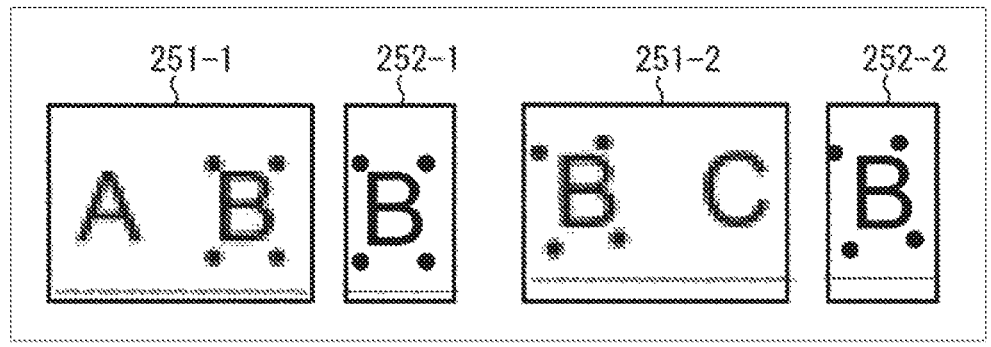
FIG. 23 A diagram describing image data items.

In the image processors 33-1 and 33-2 of FIGS. 21 and 22, RAW data items of overlapping-region images 252-1 and 252-2 are also recorded and transmitted in addition to low-resolution data items of photographic images 251-1 and 251-2 as shown in FIG. 23. After that, the high-resolution data items of the photographic images (not shown) are recorded and transmitted.

Therefore, a composition condition can be generated by the use of the RAW data items of the overlapping-region images and preview display can be performed by the use of the low-resolution data items in advance. With this, the working efficiency can be increased and the accuracy of the composition condition can be enhanced. Further, the success probability of composition processing can be enhanced.

<Example of Image Processing>

Figure 24:
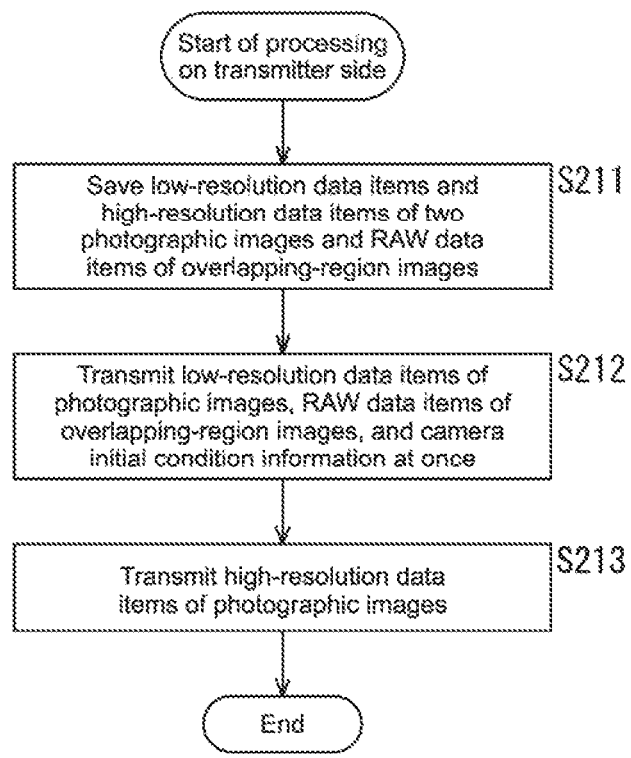
FIG. 24 A flowchart describing image processing of the image processor of FIG. 21.

Next, image processing executed by the image processor 33-1 on the transmitter side of FIG. 21 will be described with reference to the flowchart of FIG. 24.

The DSP circuit 31 records, in the memory 34, low-resolution data items and high-resolution data items of photographic images and RAW data items of overlapping-region images. In Step S211, the memory 34 records the low-resolution data items and the high-resolution data items of the photographic images and the RAW data items of the overlapping-region images.

In Step S212, the file transfer unit 211-1 transmits the low-resolution data items of the photographic images, the RAW data items of the overlapping-region images, and the camera initial condition information of the EEPROM 32 to the image processor 33-2 via the network I/F 39 at once.

In Step S213, the file transfer unit 211-2 transmits the high-resolution data items of the photographic images to the image processor 33-2 via the network I/F 39 after the processing of Step S212.

Figure 25:
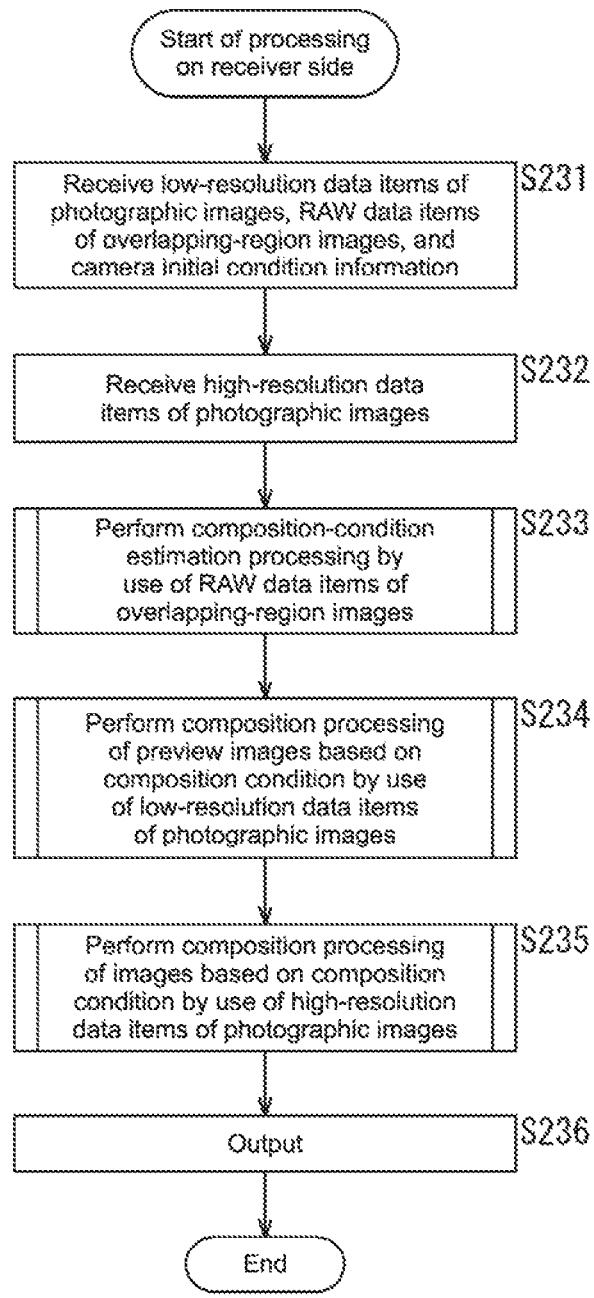
FIG. 25 A flowchart describing image processing of the image processor of FIG. 22.

Next, stitching processing executed by the image processor 33-2 on the receiver side of FIG. 22 will be described with reference to the flowchart of FIG. 25.

In Step S231, the file receiver 231-1 receives the low-resolution data items of the photographic images from the image processor 33-1, the RAW data items of the overlapping-region images, and the camera initial condition information via the network I/F 39 and records them in the memory 34.

In Step S232, the file receiver 231-2 receives the high-resolution data items of the photographic images from the image processor 33-2 via the network I/F 39 and records them in the memory 34.

The composition-condition estimation processor 232 reads out, from the memory 34, the camera initial condition information, the low-resolution data items of the photographic images, and the RAW data items of the overlapping-region images. In Step S233, the composition-condition estimation processor 232 estimates a composition condition by the use of the RAW data items of the overlapping-region images out of them. Details of this composition-condition estimation processing are different only in that the used data is the RAW data and it is basically the same as the composition-condition estimation processing of FIG. 11. Therefore, descriptions thereof will be omitted.

In Step S234, the image composition processor 233 performs preview-image composition processing based on the composition condition by the use of the low-resolution data items of the photographic images to generate a composite image. Note that, regarding this composition processing, the images used therefor and the condition on which it is based are merely different and it is basically the same as the composition processing of FIG. 12. Therefore, descriptions thereof will be omitted. The image composition processor 233 records the generated preview composite image in the memory 34 and outputs it to the preview display controller 234. The preview display controller 234 causes the display unit 35 to display the preview composite image.

In Step S235, the image composition processor 233 performs image composition processing based on the composition condition by the use of the high-resolution data items of the photographic images to generate a composite image. Note that, regarding this composition processing, the images used therefor and the condition on which it is based are merely different and it is basically the same as the composition processing of FIG. 12. Therefore, descriptions thereof will be omitted. The image composition processor 152 records the generated composite image in the memory 34, and, in Step S236, outputs it to the display controller 54. The display controller 54 causes the display unit 35 to display the composite image.

As described above, when the photographic images is transferred, the composition condition can be generated by the use of the RAW data items of the overlapping-region images and preview display can be performed by the use of the low-resolution data items in advance. With this, the working efficiency can be increased and the accuracy of the composition condition can be enhanced. Further, the success probability of composition processing can be enhanced.

Note that, although the example in which the photographic images are used in the composition processing has been described also in the fourth embodiment, the technology of the second embodiment is also applicable to a case where, as in the first embodiment, each of the photographic images is divided into the three regions and composition processing corresponding to each region is performed.

By the way, in the second embodiment, the example in which the composition condition is estimated by the use of the RAW data items as the overlapping-region images has been described. Next, an example in which a composition condition is estimated by the use of high-frame rate images as the overlapping-region images will be described. Note that it is an effective method when cameras do not have a function of synchronizing video-capturing start times between the cameras with higher accuracy in comparison with 1-frame time.

<Fifth Embodiment (Example of High-Frame Rate Image)>

<Configuration Example of Image Processor>

Figure 26:
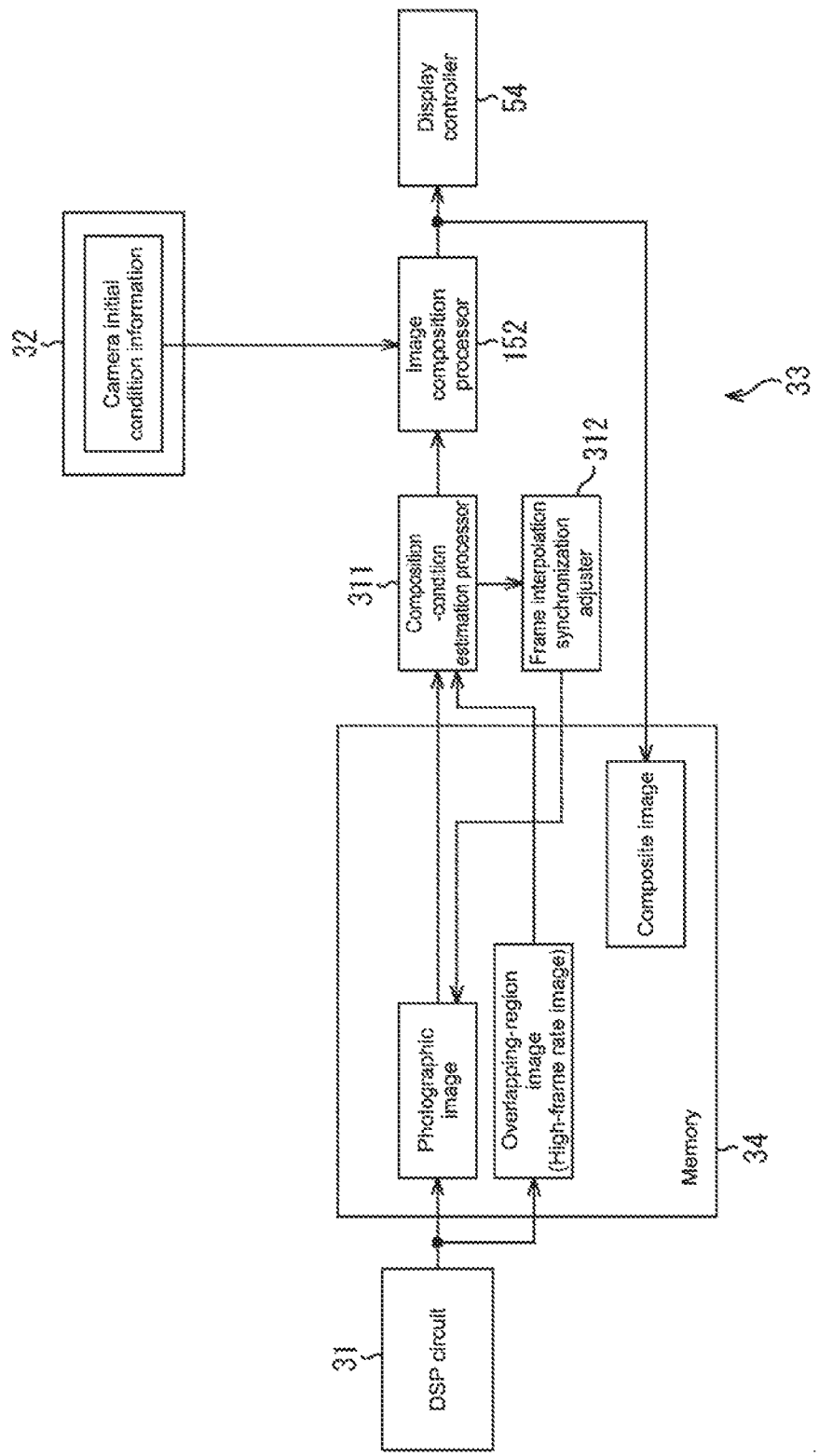
FIG. 26 A block diagram showing another functional configuration example of the image processor.

FIG. 26 is a block diagram showing another example of the functional configuration of the image processor.

An image processor 33 of FIG. 26 is common to the image processor 33 of FIG. 13 in that it includes an image composition processor 152 and a display controller 54. The image processor 33 of FIG. 26 is different from the image processor 33 of FIG. 13 in that the composition-condition estimation processor 151 is replaced by a composition-condition estimation processor 311 and a frame interpolation synchronization adjuster 312 is added.

Further, the image processor 33 of FIG. 26 is different from the image processor 33 of FIG. 13 in that the RAW data items of the overlapping-region images recorded in the memory 34 are replaced by high-frame rate images of overlapping-region images.

That is, photographic images from a DSP circuit 31 are recorded in a memory 34. Further, at this time, the DSP circuit 31 also records high-frame rate images of the overlapping-region images in the memory 34.

The composition-condition estimation processor 311 reads out, from the memory 34, photographic images and the overlapping-region images (high-frame rate images). The composition-condition estimation processor 311 matches feature points, determines errors, and estimates a composition condition by the use of the photographic images and the overlapping-region images (high-frame rate images).

At this time, the composition-condition estimation processor 311 performs matching between feature points of the photographic image of one camera and feature points of the high-frame rate image of the overlapping region of the other camera. On the basis of the matching errors, the composition-condition estimation processor 311 analyzes a time difference between a frame of the overlapping region of the other camera having a minimum matching error and a frame of the photographic image of the one camera. When the time difference is present, the composition-condition estimation processor 311 causes the frame interpolation synchronization adjuster 312 to perform frame interpolation with respect to a subsequent frame of the photographic image of the other camera and store it in the memory 34 as the photographic image of the other camera. With this, the photographic images of the two cameras can be synchronized with the frame having the minimum matching error being a point of origin.

Then, the composition-condition estimation processor 311 matches feature points determines errors and estimates a composition condition by the use of both the synchronized photographic images. The composition-condition estimation processor 311 supplies the estimated composition condition and the photographic images to the image composition processor 152.

Under the control of the composition-condition estimation processor 311, the frame interpolation synchronization adjuster 312 performs frame interpolation with respect to a subsequent frame of the photographic image of the other camera and stores it in the memory 34 as the photographic image of the other camera.

The image composition processor 152 performs composition processing with respect to the photographic images by the use of the composition condition from the composition-condition estimation processor 311 to generate a composite image. The image composition processor 152 records the generated composite image in the memory 34 and outputs it to the display controller 54.

Next, composition processing of the image processor 33 of FIG. 26 will be described with reference to FIG. 27. Note that, hereinafter, for the sake of convenience, the one camera module will be referred to as a main camera and the other camera module on which the frame interpolation is performed will be referred to as a slave camera. Whether to perform frame interpolation on the camera module 11-1 or the camera module 11-2 is recorded in the EEPROM 32 as one information item of the camera initial condition information, for example. Further, a circle in each image of FIG. 27 expresses a clock and a line in the circle indicates a point of time. When the line is at the same position, it indicates the same point of time.

Figure 27:
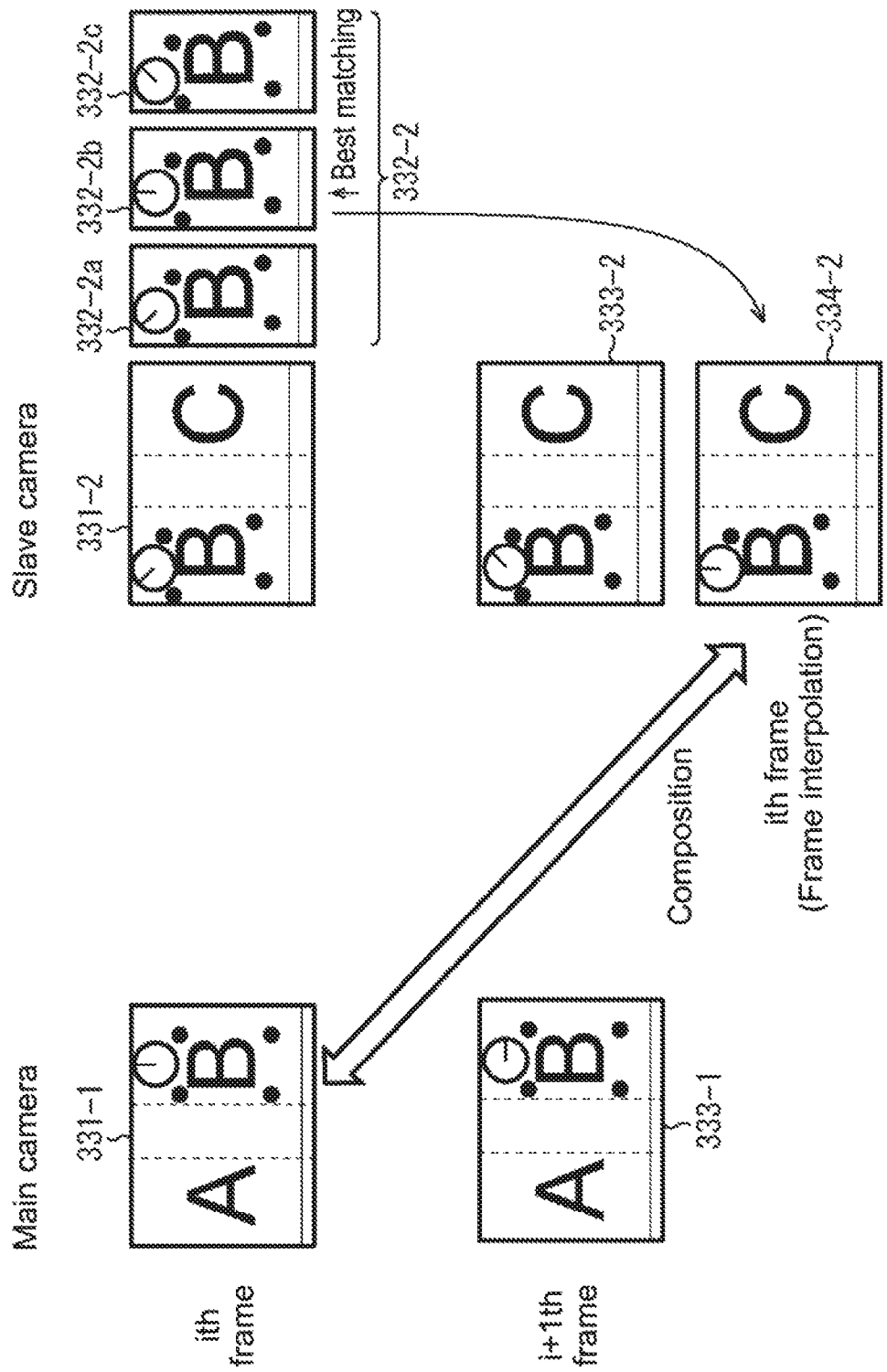
FIG. 27 A diagram describing image data items.

In the image processor 33 of FIG. 26, as shown in FIG. 27, a high-frame rate image 332-2 of an overlapping-region image of the slave camera is recorded in addition to, for example, a photographic image 331-1 of the main camera and a photographic image 331-2 of the slave camera that are in an ith frame. In the example of FIG. 27, an example in which the high-frame rate image 332-2 has a frame rate twice as high as those of the photographic images 331-1 and 331-2 is shown.

Note that FIG. 27 also shows a photographic image 333-1 of the main camera and a photographic image 333-2 of the slave camera that are in an i+1th frame. That is, a high-frame rate image 332-2a is an image at the same point of time as the photographic image 331-2 of the slave camera in the ith frame. A high-frame rate image 332-2b is an image at a point of time delayed by ½ frame from that of the photographic image 331-2 of the slave camera. A high-frame rate image 332-2c is an image at a point of time delayed by 1 frame from that of the photographic image 331-2 of the slave camera (i.e., image at the same point of time as the high-frame rate image 332-2).

First of all, feature points are matched by the use of the photographic image 331-1 of the main camera and the high-frame rate image 332-2 of the overlapping region of the slave camera, and thus errors are determined. A frame whose determined error is minimum (in case of FIG. 27, high-frame rate image 332-2b) is determined.

Then, when the frame having the minimum error (in case of FIG. 27, high-frame rate image 332-2b) and the frame of the photographic image of the main camera (photographic image 331-1) are not at the same point of time, a photographic image 334-2 created anew at the point of time of the high-frame rate image 332-2b (point of time delayed by ½ frame) is used as the ith frame of the slave camera and subsequent frames of the slave camera are also interpolated.

After that, a composition condition is generated by the use of a result of the frame interpolation as described above. With this, the accuracy of the composition condition in a time direction can be enhanced.

Note that the above-mentioned imaging of the overlapping regions at the high frame rate may be limited only to be performed at an initial part of the imaging start. Alternatively, the imaging of the overlapping regions at the high frame rate may be limited to be performed at the initial part of the imaging start and every certain time.

<Example of Image Processing>

Figure 28:
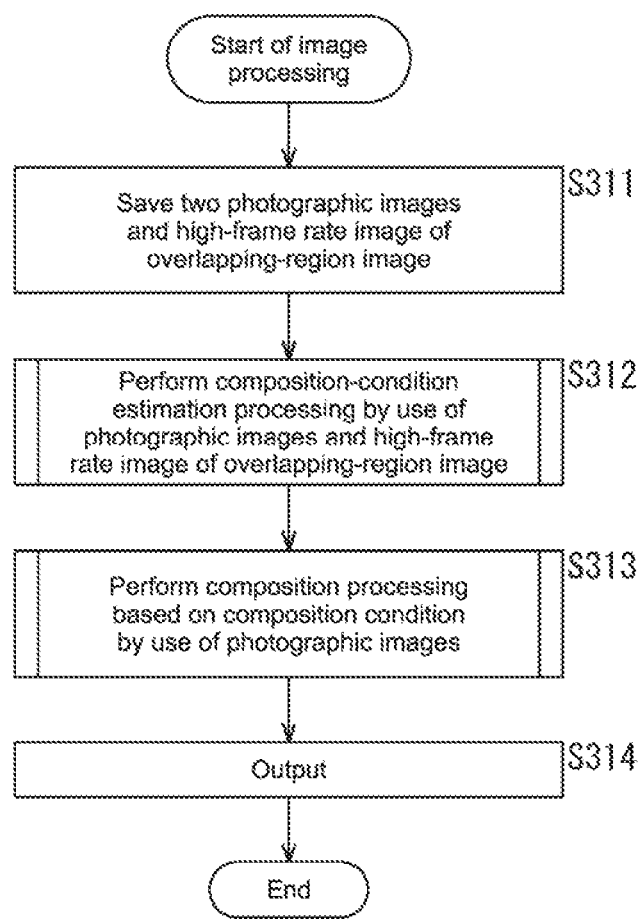
FIG. 28 A flowchart describing image processing of the image processor of FIG. 26.

Next, stitching processing executed by the image processor 33 of FIG. 26 will be described with reference to the flowchart of FIG. 28.

The DSP circuit 31 causes the memory 34 to save two captured photographic images and a high-frame rate image of an overlapping-region image of the one camera module. In Step S311, the memory 34 saves the two captured images and the high-frame rate image of the overlapping-region image of the one camera module.

The composition-condition estimation processor 171 reads out, from the memory 34, the photographic images and the overlapping-region image (high-frame rate image). In Step S312, the composition-condition estimation processor 171 performs composition-condition estimation processing by the use of the photographic images and the overlapping-region image (high-frame rate image). This composition-condition estimation processing will be described later in detail with reference to FIG. 29.

When the composition condition is estimated in Step S312, the composition-condition estimation processor 171 supplies the estimated composition condition and the photographic images to the image composition processor 152.

In Step S313, the image composition processor 152 performs composition processing based on the composition condition, which is estimated in Step S312, by the use of the photographic images. Note that, regarding this composition processing, the images used therefor and the condition on which it is based are merely different and it is basically the same as the composition processing of FIG. 12. Therefore, descriptions thereof will be omitted.

A composite image is generated in the above-mentioned manner. Therefore, in Step S314, the image composition processor 152 records the generated composite image in the memory 34 and outputs it to the display controller 54.

Figure 29:
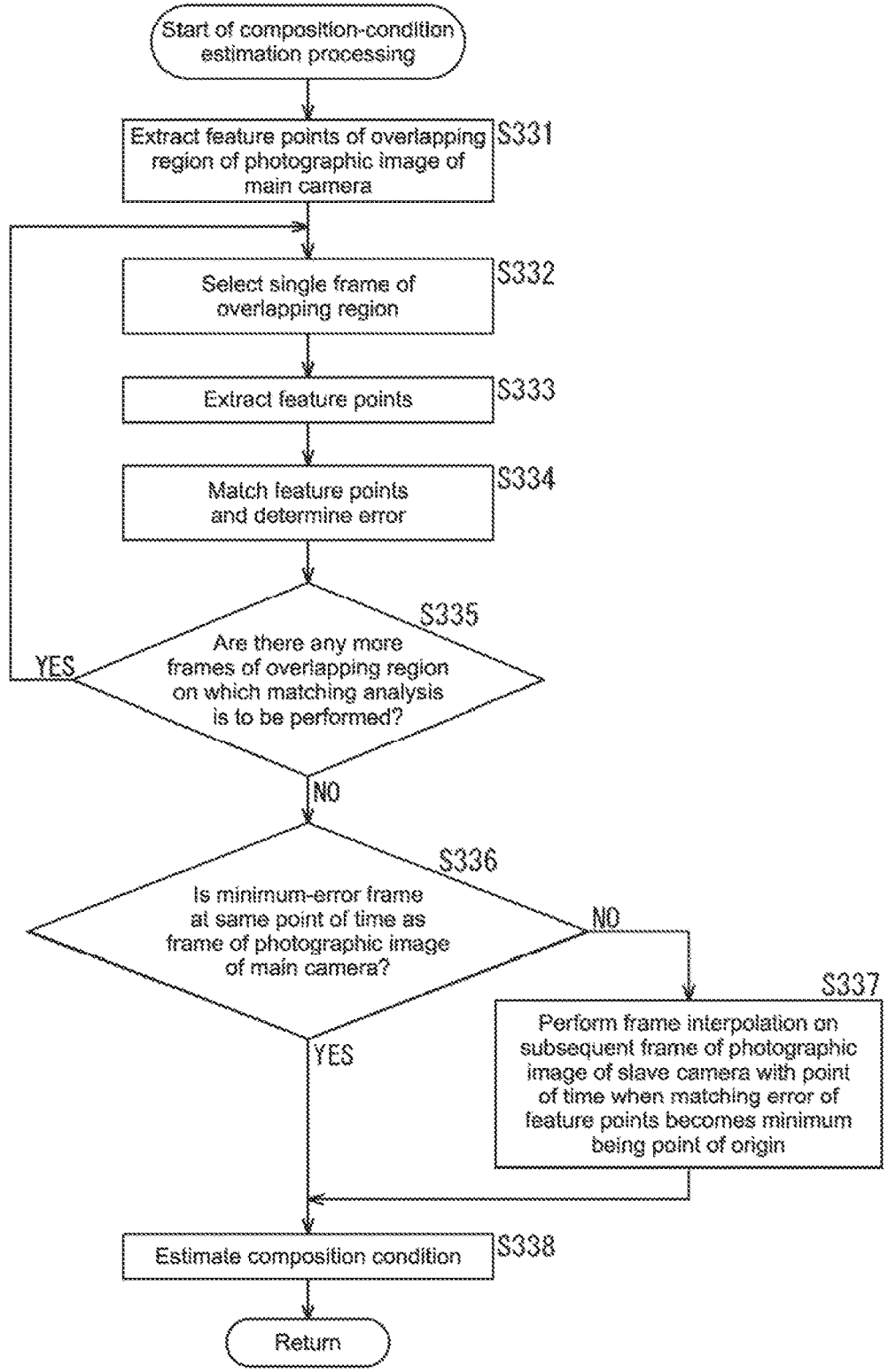
FIG. 29 A flowchart describing composition-condition estimation processing.

Next, composition-condition estimation processing of Step S312 of FIG. 28 will be described with reference to the flowchart of FIG. 29.

In Step S331, the composition-condition estimation processor 311 extracts feature points of an overlapping region of a photographic image of the main camera. In Step S332, the composition-condition estimation processor 311 selects one frame of an overlapping region of the slave camera. In Step S333, the composition-condition estimation processor 311 extracts feature points by the use of the selected frame.

In Step S334, the composition-condition estimation processor 311 performs matching between feature points of the overlapping region of the photographic image of the main camera and feature points of the frame of the overlapping region of the slave camera and determines errors.

In Step S335, the composition-condition estimation processor 311 determines whether or not there are any more frames of the overlapping region on which a matching analysis is to be performed. In Step S335, when it is determined that there are any more frames of the overlapping region on which the matching analysis is to be performed, the processing returns to Step S332 and the subsequent processing is repeated.

In Step S335, when it is determined that there are not any more frames of the overlapping region on which the matching analysis is to be performed, the processing proceeds to Step S336. In Step S336, the composition-condition estimation processor 311 determines whether or not a frame having a minimum matching error is at the same point of time as the frame of the photographic image of the main camera.

In Step S336, when it is determined that the frame having the minimum matching error is not at the same point of time as the frame of the photographic image of the main camera, the processing proceeds to Step S337.

In Step S337, under the control of the composition-condition estimation processor 311, the frame interpolation synchronization adjuster 312 performs frame interpolation on a subsequent frame of the photographic image of the slave camera with the point of time at which the matching error of the feature points is minimum being a point of origin.

Specifically, as described above with reference to FIG. 27, when the frame having the minimum error (in case of FIG. 27, high-frame rate image 332-2b) and the frame of the photographic image (photographic image 331-1) of the main camera are at the same point of time, an ith photographic image of the slave camera is created anew at the point of time (point of time delayed by ½ frame) of the high-frame rate image 332-2b.

Then, using the created photographic image 334-2 as the ith frame of the slave camera, the frame interpolation is performed on a subsequent frame of the photographic image of the slave camera. The image subjected to the frame interpolation is stored in the memory 34 as the photographic image, and then the processing proceeds to Step S338.

On the other hand, when it is, in Step S336, determined that the frame having the minimum matching error is at the same point of time as the frame of the photographic image of the main camera, the processing proceeds to Step S338.

In Step S338, the composition-condition estimation processor 311 matches feature points, determines errors, and estimates a composition condition by the use of the photographic images synchronized by the frame interpolation. The estimated composition condition and the photographic images are supplied to the image composition processor 152.

As described above, the high-frame rate image of the overlapping region is saved other than the photographic images and the composition condition based on the high-frame rate image of the exposure overlapping region is generated. With this, the accuracy of the composition condition in the time direction can be enhanced.

Note that, although the example in which the photographic images are used in the composition processing has been described also in the fifth embodiment, the technology of the fifth embodiment is also applicable to a case where, as in the first embodiment, each of the photographic images is divided into the three regions and composition processing corresponding to each region is performed.

Further, although the imaging apparatus has been described above as an example, the present technology is also applicable to an image processing apparatus as long as it includes an image processor capable of stitching images including an overlapping region.

Note that the above-mentioned series of processing may be executed by hardware or may be executed by software. When the series of processing is executed by software, a program configuring the software is installed in a computer. Here, examples of the computer include a computer incorporated in dedicated hardware and a general-purpose personal computer capable of executing various functions by installing various programs.

<Sixth Embodiment (Computer)>
<Configuration Example of Computer>

Figure 30:
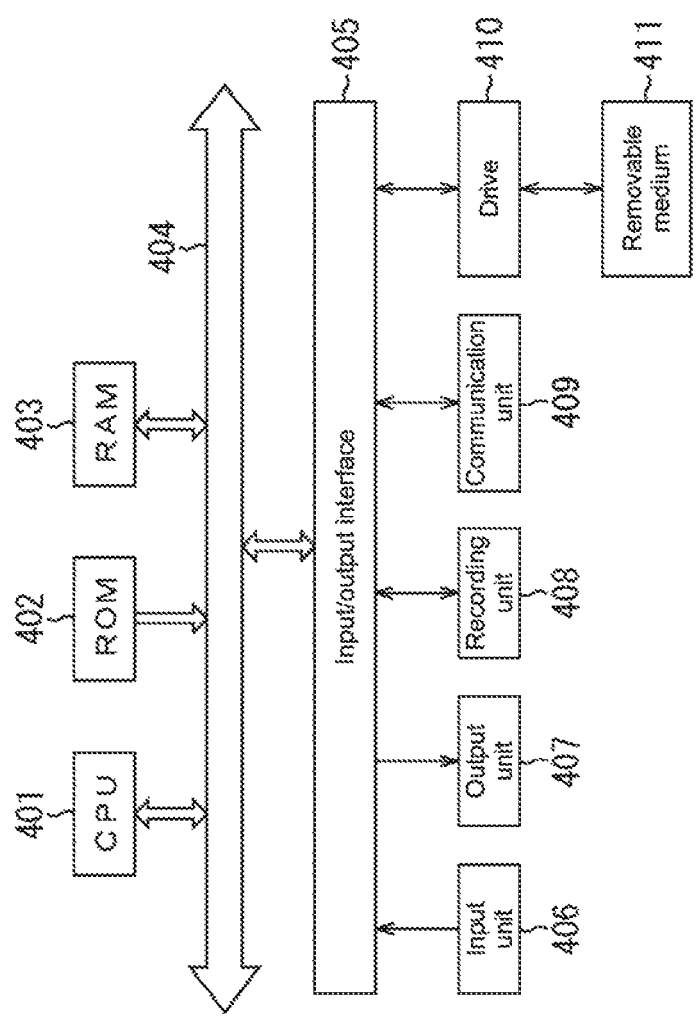
FIG. 30 A block diagram showing a configuration example of an electronic apparatus to which the present technology is applied.

FIG. 30 is a block diagram showing a configuration example of hardware of a computer that executes the above-mentioned series of processing according to the program.

In a computer 400, a CPU (Central Processing Unit) 401, a ROM (Read Only Memory) 402, and a RAM (Random Access Memory) 403 are connected to one another via a bus 404.

An input/output interface 405 is further connected to the bus 404. An input unit 406, a output unit 407, a storage unit 408, a communication unit 409, and a drive 410 are connected to the input/output interface 405.

The input unit 406 is constituted of a keyboard, a mouse, a microphone, and the like. The output unit 407 is constituted of a display, a speaker, and the like. The storage unit 408 is constituted of a hard disk, a nonvolatile memory, and the like. The communication unit 409 is constituted of a network interface and the like. The drive 410 drives a removable recording medium 411 such as a magnetic disk, an optical disc, a magneto-optical disk, and a semiconductor memory.

As described above, in the thus configured computer, the above-mentioned series of processing is performed by, for example, the CPU 401 loading the program stored in the storage unit 408 into the RAM 403 via the input/output interface 405 and the bus 404 and executing it.

The program executed by the computer (CPU 401) can be provided while being recorded in the removable recording medium 411 as a package medium, for example. Further, the program can be provided via a wired or wireless transmission medium such as a local area network, the Internet, and digital broadcasting.

In the computer, the program can be installed in the storage unit 408 via the input/output interface 405 by mounting the removable recording medium 411 on the drive 410. Further, the program can be received by the communication unit 409 and installed in the storage unit 408 via the wired or wireless transmission medium. Otherwise, the program can be installed in advance in the ROM 402 or the storage unit 408.

Note that the program executed by the computer may be a program whose processes are sequentially performed in the order described herein or may be a program whose processes are concurrently performed or at a necessary timing, for example, upon calling.

Note that, herein, the steps that describe the above-mentioned series of processing include, as a matter of course, processes sequentially performed in the described order, and also include processing executed concurrently or individually without the need to be sequentially processed.

Further, embodiments in the present disclosure are not limited to the above-mentioned embodiments and various variants can be made without departing from the gist of the present disclosure.

In addition, the present disclosure can take a cloud computing configuration in which one function is shared and cooperatively processed by a plurality of apparatuses via a network.

Further, the steps described above with reference to the flowcharts can be shared and executed by a plurality of apparatuses rather than being executed by a single apparatus.

In addition, when a single step includes a plurality of processes, the plurality of processes of the single step can be shared and executed by a plurality of apparatuses rather than being executed by a single apparatus.

Further, the configuration described above as a single apparatus (or processor) may be divided and configured as a plurality of apparatuses (or processors). On the contrary, the configurations described above as a plurality of apparatuses (or processors) may be unified and configured as a single apparatus (or processor). Further, as a matter of course, a configuration other than those described above may be added to the configurations of the apparatuses (or processors). In addition, as long as the entire system can have substantially the same configurations and operations, a part of the configuration of one apparatus (or processor) may be included in the configuration of another apparatus (or another processor). That is, the present technology is not limited to the above-mentioned embodiments and various variants can be made without departing from the gist of the present technology.

Although the favorable embodiments of the present disclosure have been described in detail with reference to the attached drawings, the disclosure is not limited to such examples. It is obvious that various changed examples or modified examples can be conceived by a person having ordinary skilled in the art to which the present disclosure belongs without departing from the range of technical ideas defined in the scope of claims. It should be understood that these things are also encompassed by the technical scope of the present disclosure as a matter of course.

It should be noted that the present technology may also take the following configurations.

(1) A signal processing circuit, including:
an image segmentation unit that segments each of a plurality of photographic images, which are acquired by a plurality of camera modules such that each of the plurality of photographic images includes an overlapping region in a photographic range of each of the plurality of camera modules, into an image of the overlapping region, an image of a direct-transformation region that is a non-overlapping region, and an image of a buffer region provided between the overlapping region and the direct-transformation region; and
a stitching unit that stitches the images of the overlapping regions, stitches the images of the direct-transformation regions, and stitches the images of the buffer regions, the images of the overlapping regions, the images of the direct-transformation regions, and the images of the buffer regions being segmented by the image segmentation unit.

(2) The signal processing circuit according to (1), in which
the stitching unit
stitches the images of the direct-transformation regions on the basis of camera initial condition information that is information indicating initial conditions of the plurality of camera modules,
stitches the images of the overlapping regions on the basis of a composition condition estimated by the use of the images of the overlapping regions, and
stitches the images of the buffer regions on the basis of the camera initial condition and the composition condition.

(3) The signal processing circuit according to (2), in which
the stitching unit stitches the images of the buffer regions on the basis of a value, the value being determined by the use of the camera initial condition and the composition condition.

(4) The signal processing circuit according to (2), in which
the images of the buffer regions are divided in several stages in an X-, Y-direction.

(5) The signal processing circuit according to any of (2) to (4), further including
a composition-condition estimation unit that estimates the composition condition by the use of the images of the overlapping regions.

(6) An imaging apparatus, including:
a plurality of camera modules; and
a signal processing circuit including
an image segmentation unit that segments a plurality of photographic images, which are acquired by a plurality of camera modules such that each of the plurality of photographic images includes an overlapping region in a photographic range of each of the plurality of camera modules, into an image of the overlapping region, an image of a direct-transformation region that is a non-overlapping region, and an image of a buffer region provided between the overlapping region and the direct-transformation region, and
a stitching unit that stitches the images of the overlapping regions, stitches the images of the direct-transformation regions, and stitches the images of the buffer regions, the images of the overlapping regions, the images of the direct-transformation regions, and the images of the buffer regions being segmented by the image segmentation unit.

(7) A signal processing circuit, including:
a storage unit that stores
a plurality of photographic images, which are acquired by a plurality of camera modules such that each of the plurality of photographic images includes an overlapping region in a photographic range of each of the plurality of camera modules, and
an image of the overlapping region, which has a resolution higher than a resolution of each of the photographic images;
a composition-condition estimation unit that estimates the composition condition by the use of the image of the overlapping region; and
a stitching unit that stitches the plurality of photographic images on the basis of the composition condition estimated by the composition-condition estimation unit.

(8) The signal processing circuit according to (7), in which
the image of the overlapping region is RAW data, and
the composition-condition estimation unit estimates the composition condition by the use of the RAW data of the image of the overlapping region.

(9) The signal processing circuit according to (7), in which
the image of the overlapping region is an image having a high frame rate, and
the composition-condition estimation unit estimates the composition condition by the use of the image of the overlapping region, which has a high frame rate, and estimates inter-frame synchronization involving frame interpolation.
(10) The signal processing circuit according to (9), further including
a frame interpolation unit that performs frame interpolation of one of the photographic images by the use of the image having a high frame rate, in which
the frame interpolation unit performs, on the basis of the inter-frame synchronization estimated by the composition-condition estimation unit, frame interpolation of the one of the photographic images by the use of the image having a high frame rate.
(11) The signal processing circuit according to (7), in which
the storage unit stores images of a plurality of overlapping regions, which are based on different exposure conditions, and
the composition-condition estimation unit estimates the composition condition by the use of the images of the plurality of overlapping regions, which are based on the different exposure conditions.
(12) The signal processing circuit according to (7), in which
the storage unit stores images of a plurality of overlapping regions, which have different resolutions, and
the composition-condition estimation unit estimates the composition condition by the use of the images of the plurality of overlapping regions, which have different resolutions.
(13) The signal processing circuit according to (7), further including
a reception unit that receives low-resolution data items of the plurality of photographic images and the image of the overlapping region and receives high-resolution data items of the plurality of photographic images, the low-resolution data items of the plurality of photographic images and the image of the overlapping region being transmitted preceding the high-resolution data items of the plurality of photographic images, in which
the stitching unit stitches the low-resolution data items of the plurality of photographic images on the basis of the composition condition estimated by the composition-condition estimation unit, and thereafter stitches the high-resolution data items of the plurality of photographic images.
(14) An imaging apparatus, including:
a plurality of camera modules; and
a signal processing circuit including
  a storage unit that stores a plurality of photographic images, which are acquired by a plurality of camera modules such that each of the plurality of photographic images includes an overlapping region in a photographic range of each of the plurality of camera modules, and an image of the overlapping region, which has a resolution higher than a resolution of each of the photographic images,
  a composition-condition estimation unit that estimates the composition condition by the use of the image of the overlapping region, and
  a stitching unit that stitches the plurality of photographic images on the basis of the composition condition estimated by the composition-condition estimation unit.

(15) The imaging apparatus according to (14), in which
the image of the overlapping region is an image having a high frame rate, and
the composition-condition estimation unit estimates the composition condition by the use of the image of the overlapping region, which has a high frame rate, and estimates inter-frame synchronization involving frame interpolation.

REFERENCE SIGNS LIST 1, 1-1, 1-2 imaging apparatus, 11, 11-1, 11-2 camera module, 21 optical unit, 22 solid-state imaging element, 31 DSP circuit, 32 EEPROM, 33, 33-1, 33-2 image processor, 34 memory, 35 display unit, 36 recording unit, 37 operation unit, 38 power supply unit, 39 network I/F, 40 bus line, 51 image segmentation processor, 52 composition-condition estimation processor, 53 image composition processor, 54 display controller, 151 composition-condition estimation processor, 152 image composition processor, 171 composition-condition estimation processor, 211-1, 211-2 file transfer unit, 231-1, 231-2 file receiver, 232 composition-condition estimation processor, 233 image composition processor, 234 preview display controller, 235 image composition processor, 311 composition-condition estimation processor, 312 frame interpolation synchronization adjuster

The invention claimed is:
1. A signal processing circuit, comprising:
  a storage unit configured to store a plurality of photographic images acquired by a plurality of camera modules, wherein each of the plurality of photographic images includes an overlapping region in a photographic range of each of the plurality of camera modules;
  a reception unit configured to receive:
    low-resolution data items of the plurality of photographic images,
    an image of the overlapping region, wherein the image has a resolution higher than a resolution of each of the plurality of photographic images, and
    high-resolution data items of the plurality of photographic images,
    wherein the low-resolution data items of the plurality of photographic images and the image of the overlapping region are transmitted prior to the high-resolution data items of the plurality of photographic images;
  a composition-condition estimation unit configured to estimate a composition condition based on the image of the overlapping region; and
  a stitching unit configured to:
    stitch the low-resolution data items of the plurality of photographic images based on the composition condition, and
    stitch, subsequent to the stitch of the low-resolution data items, the high-resolution data items of the plurality of photographic images.
2. The signal processing circuit according to claim 1, wherein:
  the image of the overlapping region is RAW data, and
  the composition-condition estimation unit is further configured to estimate the composition condition based on the RAW data of the image of the overlapping region.
3. The signal processing circuit according to claim 1, wherein:
  the image of the overlapping region has a high frame rate, and
  the composition-condition estimation unit is further configured to estimate inter-frame synchronization involving frame interpolation.

4. The signal processing circuit according to claim 3, further comprising
a frame interpolation unit configured to perform frame interpolation of one of the plurality of photographic images based on the image of the overlapping region having the high frame rate, wherein
the frame interpolation unit is further configured to perform, based on the inter-frame synchronization and the image of the overlapping region having the high frame rate, the frame interpolation of the one of the plurality of photographic images.

5. The signal processing circuit according to claim 1, wherein:
the storage unit is further configured to store images of a plurality of overlapping regions,
the images are based on different exposure conditions, and
the composition-condition estimation unit is further configured to estimate the composition condition based the images.

6. The signal processing circuit according to claim 1, wherein:
the storage unit is further configured to store images of a plurality of overlapping regions,
the images have different resolutions, and
the composition-condition estimation unit is further configured to estimate the composition condition based on the images.

7. An imaging apparatus, comprising:
a plurality of camera modules;
a signal processing circuit including:
a storage unit configured to store a plurality of photographic images, acquired by the plurality of camera modules, wherein each of the plurality of photographic images includes an overlapping region in a photographic range of each of the plurality of camera modules;
a reception unit configured to receive:
low-resolution data items of the plurality of photographic images,
an image of the overlapping region, wherein the image has a resolution higher than a resolution of each of the plurality of photographic images, and
high-resolution data items of the plurality of photographic images,
wherein the low-resolution data items of the plurality of photographic images and the image of the overlapping region are transmitted prior to the high-resolution data items of the plurality of photographic images;
a composition-condition estimation unit configured to estimate a composition condition based on the image of the overlapping region; and
a stitching unit configured to:
stitch the low-resolution data items of the plurality of photographic images based on the composition condition, and
stitch, subsequent to the stitch of the low-resolution data items, the high-resolution data items of the plurality of photographic images.

8. The imaging apparatus according to claim 6, wherein:
the image of the overlapping region has a high frame rate, and
the composition-condition estimation unit is further configured to estimate inter-frame synchronization involving frame interpolation.

* * * * *